United States Patent
Misawa et al.

(10) Patent No.: US 10,582,096 B2
(45) Date of Patent: Mar. 3, 2020

(54) DIGITAL CAMERA AND DISPLAY METHOD OF DIGITAL CAMERA

(71) Applicant: FUJIFILM Corporation, Tokyo (JP)

(72) Inventors: Takeshi Misawa, Saitama (JP); Kentaro Tokiwa, Saitama (JP); Hirofumi Horii, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/138,048

(22) Filed: Sep. 21, 2018

(65) Prior Publication Data

US 2019/0089873 A1 Mar. 21, 2019

Related U.S. Application Data

(63) Continuation of application No. PCT/JP2017/010236, filed on Mar. 14, 2017.

(30) Foreign Application Priority Data

Mar. 23, 2016 (JP) .................................. 2016-058128

(51) Int. Cl.
*H04N 5/225* (2006.01)
*G03B 17/18* (2006.01)
(Continued)

(52) U.S. Cl.
CPC ..... *H04N 5/2252* (2013.01); *G02F 1/133308* (2013.01); *G03B 17/18* (2013.01);
(Continued)

(58) Field of Classification Search
CPC .............. G02F 1/133308; G03B 17/18; H04N 2005/4408; H04N 5/225; H04N 5/2252; H04N 5/232; H04N 5/232935
See application file for complete search history.

(56) References Cited

U.S. PATENT DOCUMENTS 8,334,920 B2 * 12/2012 Seto ..................... G11B 27/34
348/208.2
9,524,139 B2 * 12/2016 Aurongzeb ......... G06F 3/04886
(Continued)

FOREIGN PATENT DOCUMENTS

CN 1761314 A 4/2006
CN 1913681 A 2/2007
(Continued)

OTHER PUBLICATIONS

International Preliminary Report on Patentability and Written Opinion of the International Searching Authority(Forms PCT/IB/326, PCT/IB/373 and PCT/ISA/237), dated Oct. 4, 2018, for International Application No. PCT/JP2017/010236, with an English Translation of the Written Opinion.
(Continued)

*Primary Examiner* — Amy R Hsu
(74) *Attorney, Agent, or Firm* — Birch, Stewart, Kolasch & Birch, LLP

(57) ABSTRACT

The digital camera includes a first display unit which is a variable-angle display device disposed on a rear surface of a camera main body and a second display unit disposed on an upper surface of the camera main body. A display controller displays the live view image and first camera information items on the first display unit, and displays second camera information items on the second display unit. In a case where the first display unit and the second display unit have a posture relationship with which display screens thereof are simultaneously visible, the display controller removes at least overlapped information items among the first camera information items displayed on the first display unit which are overlapped with the second camera information items displayed on the second display unit from the first display unit through first animation and second animation indicating a removing process.

16 Claims, 14 Drawing Sheets

(51) Int. Cl.
　　　H04N 5/232　　(2006.01)
　　　G02F 1/1333　　(2006.01)
　　　H04N 5/44　　(2011.01)
(52) U.S. Cl.
　　　CPC ............ *H04N 5/225* (2013.01); *H04N 5/232* (2013.01); *H04N 5/232935* (2018.08); *H04N 2005/4408* (2013.01)

(56) References Cited

U.S. PATENT DOCUMENTS

| | | | |
|---|---|---|---|
| 2010/0245652 | A1 | 9/2010 | Seto |
| 2012/0134642 | A1* | 5/2012 | Okamura ............ H04N 5/2252 386/230 |
| 2015/0116362 | A1 | 4/2015 | Aurongzeb et al. |
| 2015/0261393 | A1* | 9/2015 | Sadatsuki ............ G06F 3/0482 715/810 |
| 2015/0294146 | A1* | 10/2015 | Ogara ................ H04N 5/23293 348/333.06 |
| 2016/0117864 | A1* | 4/2016 | Cajigas .................... G09G 5/00 345/633 |
| 2017/0301130 | A1* | 10/2017 | Kasahara ................ G06T 15/20 |

FOREIGN PATENT DOCUMENTS

| | | |
|---|---|---|
| JP | 2007-228084 A | 9/2007 |
| JP | 2010-98466 A | 4/2010 |
| JP | 2010-192998 A | 9/2010 |
| JP | 2010-233081 A | 10/2010 |
| JP | 2013-76892 A | 4/2013 |
| JP | 2013-168824 A | 8/2013 |
| JP | 2013-200853 A | 10/2013 |

OTHER PUBLICATIONS

International Search Report (Form PCT/ISA/210), dated Jun. 13, 2017, for corresponding International Application No. PCT/JP2017/010236, with an English translation.
German Office Action dated May 16, 2019, for counterpart German Patent Application No. 112017000986.3, with English translation.
Chinese Office Action and Search Report, dated Jan. 28, 2019, for corresponding Chinese Application No. 201780018200.1, with English translations.

* cited by examiner

DIGITAL CAMERA AND DISPLAY METHOD OF DIGITAL CAMERA

CROSS-REFERENCE TO RELATED APPLICATIONS

The present application is a Continuation of PCT International Application No. PCT/JP2017/010236 filed on Mar. 14, 2017 claiming priority under 35 U.S.C § 119(a) to Japanese Patent Application No. 2016-058128 filed on Mar. 23, 2016. Each of the above applications is hereby expressly incorporated by reference, in their entirety, into the present application.

BACKGROUND OF THE INVENTION

1. Field of the Invention

The present invention relates to a digital camera and a display method of a digital camera, and particularly, to a technology that displays a live view image and a plurality of camera information items including an imaging condition to be used in framing.

2. Description of the Related Art

In the related art, as a digital camera that includes an upper liquid crystal display unit disposed on an upper surface of a camera main body and a rear liquid crystal display unit disposed on a rear surface of the camera main body, there has been suggested the digital camera in which a posture of at least one of the upper liquid crystal display unit or the rear liquid crystal display unit is changeable, and the display contents to be displayed on both display screens are switched between a case where a positional relationship between the upper liquid crystal display unit and the rear liquid crystal display unit is a first positional relationship with which the display screen of the upper liquid crystal display unit and the display screen of the rear liquid crystal display unit are simultaneously invisible and a case where the positional relationship is a second positional relationship (positional relationship with which the display units are substantially parallel) with which the display screens thereof are simultaneously visible (JP2010-192998A).

Specifically, in a case where the upper liquid crystal display unit and the rear liquid crystal display unit have the first positional relationship with which the display screens thereof are simultaneously invisible (are not substantially parallel), "imaging condition information items" are displayed on the upper liquid crystal display unit, and "captured image" and "imaging condition information items" are displayed on the rear liquid crystal display unit. Meanwhile, in a case where the upper liquid crystal display unit and the rear liquid crystal display unit have the second positional relationship with which the display screens thereof are simultaneously visible (are substantially parallel), "imaging condition information items" are displayed on the upper liquid crystal display unit, and only "captured image" is displayed on the rear liquid crystal display unit.

As stated above, in a case where the display screen of the upper liquid crystal display unit and the display screen of the rear liquid crystal display unit are substantially parallel and both the display screens are able to be simultaneously viewed, the display of "imaging condition information items" displayed so as to be overlapped on both the display screens are removed from the rear liquid crystal display unit, and thus, it is easy to see "captured image" displayed on the rear liquid crystal display unit.

JP2010-233081A describes a digital camera that in a state in which a plurality of images each having classification information is displayed on a display unit of the digital camera, in a case where a user vibrates the digital camera (in a case where vibration of a predetermined value or more is applied to the digital camera), the plurality of images displayed on the display unit is displayed so as to be classified on a display screen of the display unit by using the classification information of each image.

Here, in a case where the plurality of images is displayed so as to be classified on the display screen of the display unit, the unclassified images displayed in a central portion of the display screen of the display unit are displayed so as to be disposed (moved) in any classification display region among classification display regions (classification display regions indicating four classifications of person, scene, flower, and the others) in four corners of the display screen of the display unit. In a case where the digital camera is greatly vibrated, the unclassified images are skipped to the outside of the display screen.

Accordingly, the images moved to any classification display region among the classification display regions in the four corners of the display screen are selected, and thus, it is possible to extract (search for) a desired image from the plurality of images.

JP2007-228084A describes a digital camera that in a case where a user touches an image displayed on a first display unit with their finger and moves the finger so as to reach a second display unit adjacent to the first display unit while maintaining the finger touched on the image, the displayed selection image is also continuously moved to the second display unit according to the movement of the finger and the selection image is moved so as to reach a state in which the selection image is displayed on only the second display unit through a state in which the selection image is displayed across the first display unit and the second display unit.

Accordingly, in a case where a desired image is selected from a plurality of images, it is possible to reliably perform a selection operation of the image which is easy to be intuitively understood.

SUMMARY OF THE INVENTION

The digital camera described in JP2010-192998A has a problem that in a case where a posture of at least one of the upper liquid crystal display unit or the rear liquid crystal display unit is changed and both the display screens are substantially parallel, since the imaging condition information items displayed on the rear liquid crystal display unit are suddenly removed, the user is confused.

By contrast, JP2010-233081A describes the technology in which the image displayed in the central portion of the display screen is moved to the classification display region among the classification display regions in the four corners of the display screen which corresponds to the classification information of the image by vibrating the digital camera or the image displayed in the central portion of the display screen is skipped to the outside of the display screen by greatly vibrating the digital camera. JP2010-233081A describes the technology in which the image is moved to the classification display region of the display screen or the outside of the display screen by using a trigger that the user vibrates the digital camera and the image is not automatically moved.

JP2007-228084A describes the technology that the user touches the image displayed on the first display unit with their finger and moves the finger until the finger reaches the second display unit adjacent to the first display unit while maintaining the finger touched on the image, and thus, the image is continuously moved to the second display unit from the first display unit according to the movement of the finger. However, JP2007-228084A describes the technology in which the user moves the image by dragging the image and the image is not automatically moved.

JP2010-233081A and JP2007-228084A do not describe the upper liquid crystal display unit provided at the camera main body in addition to the rear liquid crystal display unit and a so-called variable-angle liquid crystal display device disposed so as to be rotatable around the camera main body.

The present invention has been made in view of such circumstances, and an object of the present invention is to provide a digital camera and a display method of a digital camera which are capable of seeing a live view image by automatically removing camera information items from a live view image on which the camera information items are displayed so as to be superimposed under a predetermined condition, and particularly, which are capable of removing the camera information items without giving a sense of incompatibility to a user and are capable of ascertaining the removed camera information items.

In order to achieve the object, an aspect of the present invention is a digital camera that displays a live view image captured by an imaging unit and a plurality of camera information items including imaging conditions set by a setting unit. The digital camera comprises a first display unit and a second display unit that are respectively disposed at a camera main body, at least one of the first display unit or the second display unit being disposed so as to be rotatable around the camera main body, and a relative posture between the first display unit and the second display unit being changeable, a posture detection unit that detects the relative posture relationship between the first display unit and the second display unit, a determination unit that determines whether the first display unit and the second display unit have a first posture relationship with which display screens thereof are simultaneously invisible or have a second posture relationship with which the display screens thereof are simultaneously visible based on the relative posture relationship detected by the posture detection unit, a first display controller that displays the live view image on the first display unit, and displays first camera information items among the plurality of camera information items on the display screen of the first display unit, and a second display controller that displays second camera information items among the plurality of camera information items on the second display unit. In a case where the determination unit determines that the first display unit and the second display unit have the second posture relationship, the first display controller displays first animation for gathering at least overlapped information items among the first camera information items displayed on the first display unit which are overlapped with the second camera information items displayed on the second display unit in a specific region of the display screen of the first display unit, on the first display unit, and displays second animation for removing the overlapped information items from the display screen of the first display unit by moving the overlapped information items gathered in the specific region to an outside of the display screen of the first display unit, on the first display unit.

According to the aspect of the present invention, the digital camera includes the first display unit and the second display unit. At least one of the first display unit or the second display unit is disposed so as to be rotatable around the camera main body, and the relative posture between the first display unit and the second display unit is changeable. The first display controller displays the live view image on the first display unit, and displays the first camera information items among the plurality of camera information items on the display screen of the first display unit. The second display controller displays the second camera information items among the plurality of camera information items on the second display unit. The first display controller displays animation for removing the at least overlapped information items among the first camera information items displayed on the first display unit which are overlapped with the second camera information items displayed on the second display unit from the display screen of the first display unit under the predetermined condition. That is, in a case where the first display unit and the second display unit have the second posture relationship with which the display screens thereof are simultaneously visible, the first display controller displays the first animation for gathering the at least overlapped information items among the first camera information items displayed on the first display unit which are overlapped with the second camera information items displayed on the second display unit in the specific region of the display screen of the first display unit, on the first display unit, and displays the second animation for removing the overlapped information items from the display screen of the first display unit by moving the overlapped information items gathered in the specific region to the outside of the display screen of the first display unit, on the first display unit. As stated above, since the overlapped information items are automatically removed from the display screen of the first display unit, it is easy to see the live view image. Particularly, in a case where the first camera information items are removed from the first display unit, since the process until the overlapped information items are removed from the first display unit is performed through the animation, a sense of incompatibility is not given to the user compared to a case where the overlapped information items are suddenly removed. Even though the overlapped information items are removed from the display screen of the first display unit, since the removed overlapped information items are displayed on the second display unit and the first display unit and the second display unit have the second posture relationship with which the display screens thereof are simultaneously visible, it is possible to view the overlapped information items displayed on the second display unit by merely changing a gaze direction, and it is possible to easily ascertain the removed overlapped information items.

In the digital camera according to another aspect of the present invention, it is preferable that the first display controller displays the second animation for removing the overlapped information items from the display screen of the first display unit by moving the overlapped information items gathered in the specific region toward the second display unit, on the first display unit. Accordingly, it is possible to guide the gaze direction of the user to the second display unit, and the user can easily ascertain that the removed overlapped information items are displayed on the second display unit.

In the digital camera according to still another aspect of the present invention, it is preferable that the digital camera further comprises a first camera information selecting unit that selects the first camera information items to be displayed on the first display unit and the first display controller displays the first camera information items selected by the first camera information selecting unit on the first display unit. It is possible to display desired first camera information items on the first display unit through the selection of the first camera information selecting unit.

In the digital camera according to still another aspect of the present invention, the digital camera further comprises a second camera information selecting unit that selects the second camera information items to be displayed on the second display unit, and the second display controller may display the second camera information items selected by the second camera information selecting unit on the second display unit. It is possible to display desired second camera information items on the second display unit through the selection of the second camera information selecting unit.

In the digital camera according to still another aspect of the present invention, it is preferable that in a case where the overlapped information items are gathered in the specific region of the display screen of the first display unit, the first display controller displays the first animation in which a layout of the overlapped information items gathered in the specific region matches a layout of the second camera information items displayed on the second display unit, on the first display unit. Since the layout of the overlapped information items gathered in the specific region matches the layout of the second camera information displayed on the second display unit, the user can easily ascertain that the removed overlapped information items are displayed on the second display unit.

In the digital camera according to still another aspect of the present invention, it is preferable that the digital camera further comprises a second camera information selecting unit that selects the second camera information items to be displayed on the second display unit and the second display controller displays the second camera information items selected by the second camera information selecting unit on the second display unit and the first display controller displays the first animation in which the layout of the overlapped information items gathered in the specific region is changed so as to correspond to the layout of the second camera information items which are selected by the second camera information selecting unit and are displayed on the second display unit, on the first display unit. In a case where the second camera information items displayed on the second display unit are selected by the second camera information selecting unit (that is, in a case where the second camera information items displayed on the second display unit are customized), since the layout of the overlapped information items gathered in the specific region is changed so as to correspond to the layout of the customized second camera information items, the user can easily ascertain that the removed overlapped information items are displayed on the second display unit.

In the digital camera according to still another aspect of the present invention, it is preferable that in a case where the overlapped information items are gathered in the specific region of the display screen of the first display unit, the first display controller displays the first animation in which a layout of the overlapped information items gathered in the specific region matches a layout of the first camera information items displayed on the first display unit, on the first display unit. Accordingly, it is possible to easily ascertain that the overlapped information items gathered in the specific region are information items obtained by gathering the first camera information items displayed on the display screen of the first display unit.

In the digital camera according to still another aspect of the present invention, it is preferable that the display screen of the first display unit is larger than the display screen of the second display unit and an image size of the first camera information items displayed on the display screen of the first display unit is larger than an image size of the second camera information items displayed on the display screen of the second display unit.

In the digital camera according to still another aspect of the present invention, it is preferable that the first display controller displays the second animation and the first animation in which the image size of the first camera information items included in the overlapped information items is reduced on the first display unit. In a case where the image size of the first camera information items displayed on the display screen of the first display unit is larger than the image size of the second camera information items displayed on the display screen of the second display unit and the first animation and the second animation are displayed, the image size of the first camera information is reduced, and thus, the image size of the first camera information items can match the image size of the second camera information items displayed on the display screen of the second display unit. Accordingly, in a case where the overlapped information items are removed through the first animation and the second animation, the user can easily ascertain that the removed overlapped information items are displayed on the second display unit.

In the digital camera according to still another aspect of the present invention, it is preferable that the digital camera further comprises a notification unit that notifies that the overlapped information items are removed from the first display unit and the overlapped information items are displayed on the second display unit.

Since the process until the overlapped information items are removed is performed through the display of the first animation and the second animation and the notification unit separately notifies that the overlapped information items are removed, the sense of incompatibility is not given to the user compared to a case where the overlapped information items are suddenly removed under the predetermined condition.

In the digital camera according to still another aspect of the present invention, it is preferable that the second display unit and the second display controller include the notification unit and the second display controller turns on and off the second camera information items displayed on the second display unit or changes brightness of the display screen of the second display unit for a period during which the first animation and the second animation are displayed on the first display unit or for a predetermined period after the display of the second animation is ended.

In the digital camera according to still another aspect of the present invention, it is preferable that the notification unit includes a lamp disposed near the second display unit and the lamp is turned on or turned on and off for a period during which the first animation and the second animation are displayed on the first display unit or for a predetermined period after the display of the second animation is ended. The existing indicator lamp may be applied as the lamp for notifying of this kind of information.

In the digital camera according to still another aspect of the present invention, it is preferable that the digital camera further comprises an animation display selecting unit that selects whether or not to display the first animation and the second animation on the first display unit and the first display controller displays the first animation and the second animation on the first display unit only in a case where the display of the first animation and the second animation is selected by the animation display selecting unit. Through the selection of the animation display selecting unit, it is possible to select whether the first animation and the second animation are displayed on the first display unit (that is, whether the animation for removing the overlapped information items is displayed) or the first animation and the second animation are not displayed on the first display unit (that is, whether the overlapped information items are not removed).

In the digital camera according to still another aspect of the present invention, it is preferable that in a case where the overlapped information items are removed from the first display unit and the determination unit determines that the first and second display units have the first posture relationship, the first display controller displays the overlapped information items on the first display unit. In this case, in a case where the overlapped information items are displayed on the first display unit, the overlapped information items are suddenly displayed, or the overlapped information items may be displayed by reversely playing the first animation and the second animation.

In the digital camera according to still another aspect of the present invention, it is preferable that in a case where the first camera information items including the overlapped information items are removed from the display screen of the first display unit by the first display controller, the second display controller displays difference information items between the first camera information items and the second camera information items on the second display unit. In a case where the number of removed first camera information items is larger than the number of second camera information items or even though the first camera information items include the camera information items which are not included in the second camera information items, since the difference information items are displayed on the second display unit, it is possible to view the removed first camera information items on the second display unit.

Still another aspect of the present invention is a display method of a digital camera that displays a live view image captured by an imaging unit and a plurality of camera information items including imaging conditions set by a setting unit. The display method comprises a step of detecting a relative posture relationship between a first display unit and a second display unit which are respectively disposed at a camera main body, a step of determining whether the first display unit and the second display unit have a first posture relationship with which display screens thereof are simultaneously invisible or have a second posture relationship with which the display screens thereof are simultaneously visible based on the detected relative posture relationship, a step of displaying the live view image on the first display unit and displays first camera information items among the plurality of camera information items on the display screen of the first display unit in a case where it is determined that the first and second display units have the first posture relationship, a step of displaying second camera information items among the plurality of camera information items on the second display unit irrespective of the first posture relationship or the second posture relationship, and a step of displaying first animation for gathering at least overlapped information items among the first camera information items displayed on the first display unit which are overlapped with the second camera information items displayed on the second display unit in a specific region of the display screen of the first display unit, on the first display unit, and displaying second animation for removing the overlapped information items from the display screen of the first display unit by moving the overlapped information items gathered in the specific region to an outside of the display screen of the first display unit, on the first display unit, in a case where it is determined that the first and second display units have the second posture relationship.

According to the present invention, in a case where the first display unit and the second display unit have the second posture relationship with which the display screens thereof are simultaneously visible, since the at least overlapped information items among the first camera information items displayed on the first display unit which are overlapped with the second camera information items displayed on the second display unit are automatically removed, it is possible to easily see the live view image. Particularly, in a case where the overlapped information items are removed from the first display unit, since the process until the overlapped information items are removed from the first display unit is performed through the animation, a sense of incompatibility is not given to the user compared to a case where the overlapped information items are suddenly removed. Even though the overlapped information items are removed from the display screen of the first display unit, since the removed overlapped information items are displayed on the second display unit and the first display unit and the second display unit have the second posture relationship with which the display screens thereof are simultaneously visible, it is possible to view the overlapped information items displayed on the second display unit by merely changing the gaze direction, and it is possible to easily ascertain the removed overlapped information items (camera information items).

DESCRIPTION OF THE PREFERRED EMBODIMENTS

Hereinafter, preferred embodiments of a digital camera and a display method of a digital camera according to the present invention will be described with reference to the accompanying drawings.

<External Appearance of Digital Camera>

Figure 1:
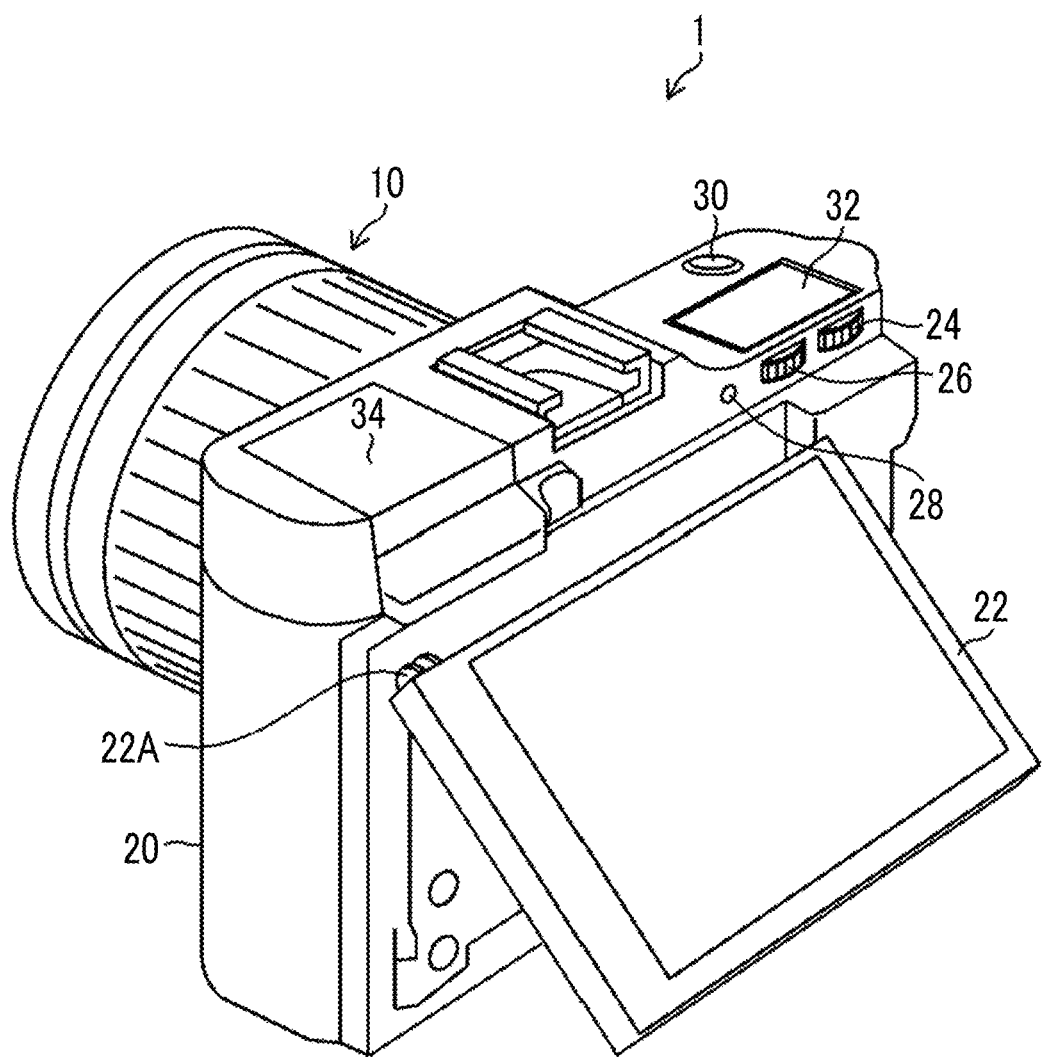
FIG. 1 is an external view showing a first embodiment of a digital camera according to the present invention, and is a perspective view in a case where the digital camera is diagonally viewed from behind.

FIG. 1 is an external view showing a first embodiment of the digital camera according to the present invention, and is a perspective view in a case where the digital camera is diagonally viewed from behind.

The digital camera 1 shown in FIG. 1 is a mirrorless digital single lens camera that includes an interchangeable lens 10 and a camera main body 20 to which the interchangeable lens 10 is detachably attached, and is not limited thereto. The digital camera may be a lens-integrated digital camera with noninterchangeable lens.

A plate-shaped first display unit 22, an exposure correction dial 24, a shutter speed dial 26, an indicator lamp 28, a playback button (not shown), multi-function cross keys including up, down, left, and right keys, a MENU/OK button, and a display/return button are mainly provided on a rear surface which is a wall surface of the camera main body 20.

A shutter button 30, a second display unit 32, and a pop-up flash 34 are mainly provided on an upper surface of the camera main body 20.

The first display unit 22 is a transmissive type color liquid crystal display device in the present example, and is a so-called variable-angle liquid crystal display device provided so as to be rotatable around the camera main body 20 in a range of about 180° by a hinge 22A.

The first display unit 22 functions as a display unit that displays a live view image or a live view image and camera information including an imaging condition such as a shutter speed or an F number by superimposing the camera information on the live view image at the time of an imaging mode or displays various menu screens in addition to playing an image captured at the time of a playback mode. The first display unit 22 may be used for a selfie by being rotated by about 180°.

The second display unit 32 is a reflective type monochrome liquid crystal display device, and is fixedly disposed so as to be flush with the upper surface of the camera main body 20 independently from the rotation of the first display unit 22.

The first display unit 22 is larger than the second display unit 32 that displays the camera information. Since the first display unit 22 mainly displays an image, the first display unit is larger than the second display unit, and thus, it is possible to easily see the image.

The exposure correction dial 24 is a dial that corrects an exposure value EV, and sets an exposure correction value in increments of (⅓) EV in a range of −3 EV to +3 EV by rotating the dial.

In a case where a shutter speed priority automatic exposure (AE) mode is set, the shutter speed dial 26 is used to set a desired shutter speed or set programmed AE or stop priority AE depending on a rotation position of the dial.

The exposure correction value set by the exposure correction dial 24 and the shutter speed set by the shutter speed dial 26 are displayed on the second display unit 32. That is, a user can set the exposure correction value or the shutter speed by operating the exposure correction dial 24 or the shutter speed dial 26 while seeing a display screen of the second display unit 32.

The indicator lamp 28 notifies of a state (focus state, hand shake, or image recording state) of a camera by turning on or turning on and off green, orange, and red lamps.

The playback button is a button that switches from the imaging mode to the playback mode for displaying a captured and recorded still image or video on the first display unit 22. The MENU/OK button is an operation button that has both a function of a MENU button for instructing that a menu is displayed on the display screen of the first display unit 22 and a function of an OK button for instructing that a selected content is confirmed and executed. The cross keys are operation keys for inputting four up, down, left and right directional instructions, and function as selection keys for selecting an item from the menu screen or instructing that various setting items are selected from each menu.

The display/return button functions as a button for switching information to be displayed on the first display unit 22 and a button for canceling the set content.

<Internal Configuration of Digital Camera>

Figure 2:
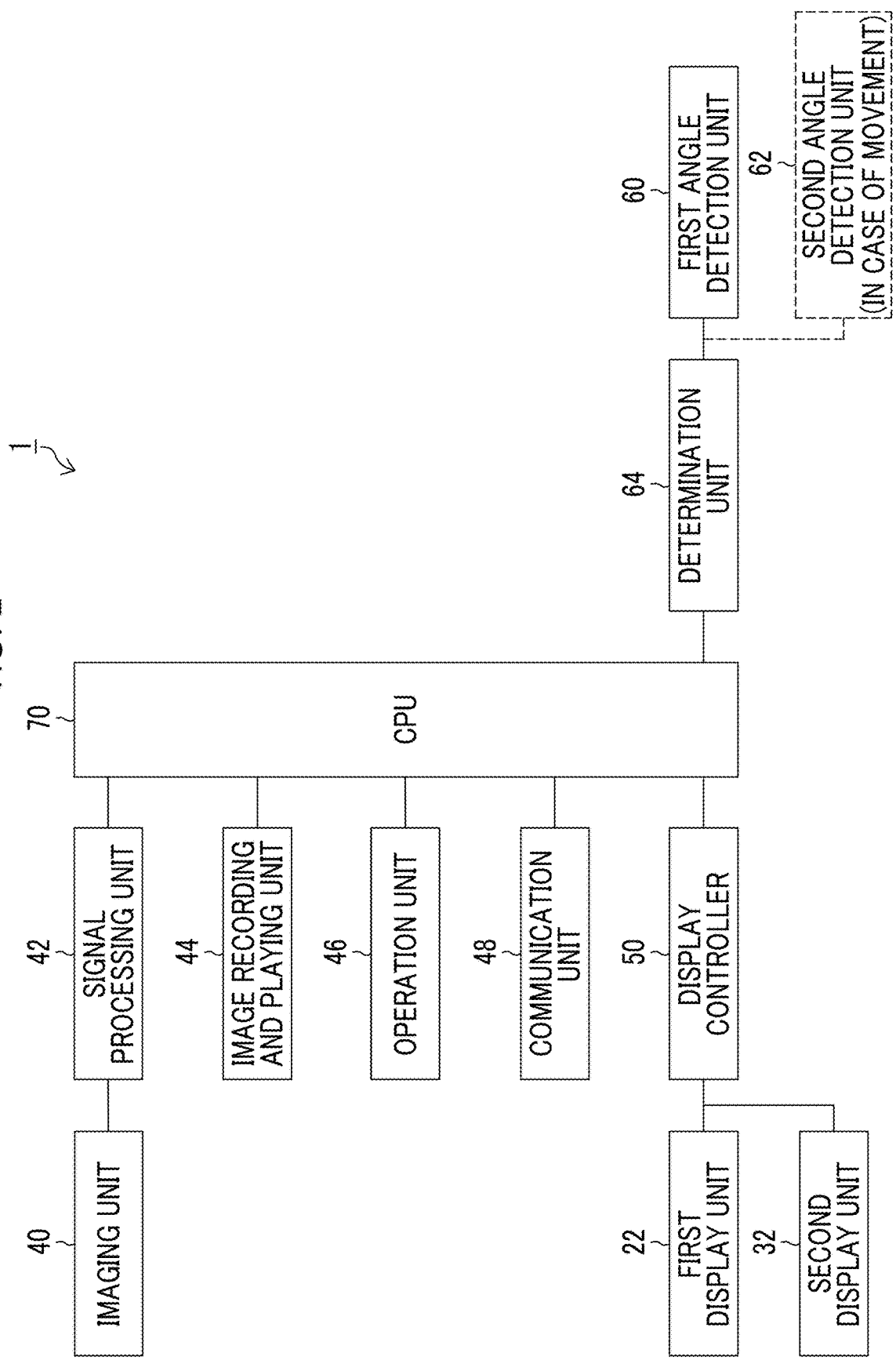
FIG. 2 is a block diagram showing an embodiment of an internal configuration of the digital camera.

FIG. 2 is a block diagram showing an embodiment of an internal configuration of the digital camera 1.

The digital camera 1 shown in FIG. 2 includes an imaging unit 40, a signal processing unit 42, an image recording and playing unit 44, an operation unit 46, a communication unit 48, a display controller 50, a first angle detection unit 60, a second angle detection unit 62, a determination unit 64, and a central processing unit (CPU) 70 in addition to the first display unit 22 and the second display unit 32.

The imaging unit 40 is an image input unit that receives image signals, and includes the interchangeable lens 10, an imaging element (not shown), and an analog front end. In a case where the imaging element is a CMOS type imaging element, the analog front end is built in the imaging element in many cases.

The imaging element is constituted by a complementary metal-oxide semiconductor (CMOS) type color image sensor. The imaging element is not limited to the CMOS type, and may be an XY address type or charge coupled device (CCD) type image sensor. The imaging element is constituted by a plurality of pixels arranged in a matrix form a predetermined pattern array (Bayer array, G stripe R/G complete checkboard, X-Trans (registered trademark) array, or honeycomb (registered trademark) array), and each pixel includes a microlens, a red (R), green (G), or blue (B) color filter, and a photoelectric conversion section (photodiode).

An optical image of a subject formed on a light reception surface of the imaging element by an imaging optical system of the interchangeable lens 10 is converted into electrical signals by the imaging element. After the gains of the converted electrical signals are adjusted within the imaging unit 40, processing such as analog-to-digital conversion is performed on the adjusted electrical signals, and the processed electrical signals are output to the signal processing unit 42, as image data items (mosaic image data items) for RGB pixels.

The signal processing unit 42 performs various digital signal processing on the image data input from the imaging unit 40. The signal processing unit 42 of the present example performs digital signal processing such as offset processing, gain control processing including white balance correction and sensitivity correction, gamma-correction processing, demosaic processing (demosaicing), or RGB/YC conversion processing on the input image data items.

The image recording and playing unit 44 includes a compression/decompression processing section and a media controller. The compression/decompression processing section performs processing for compressing uncompressed image data items (Y, Cr, and Cb) obtained by converting the RGB image data items into luminance data (Y) and color difference data items (Cr and Cb) through the RGB/YC conversion processing in a predetermined compression format (for example, a still image is compressed in a Joint Photographic Experts Group (JPEG) format and a video is compressed by H.264) at the time of recording the image data items and decompressing the compressed image data items read out from a memory card or an internal memory (hereinafter, referred to as a memory card) into uncompressed image data items (Y, Cr, and Cb) at the time of playing the image. The media controller performs control for recording the image data items compressed by the compression/decompression processing section in the memory card at the time of recording the image, and performs control for reading out the compressed image data items from the memory card at the time of playing the image.

The operation unit 46 includes the exposure correction dial 24, the shutter speed dial 26, the shutter button 30, the playback button, the cross keys, and the MENU/OK button, and may function as a setting unit that sets the imaging condition such as the shutter speed or the F number.

The communication unit 48 is a unit that transmits the image data items stored in the memory card to a smartphone or a printer through short range wireless.

The first angle detection unit 60 detects an angle formed by the display screen of the first display unit 22 which is the variable-angle liquid crystal display device and the rear surface of the camera main body 20, and functions as a posture detection unit that detects a relative posture relationship with the second display unit 32 fixedly disposed on the upper surface (the upper surface perpendicular to the rear surface of the camera main body 20) of the camera main body 20.

In a case where the second display unit 32 is a variable-angle liquid crystal display device rotatable around the camera main body 20, the second angle detection unit 62 detects the angle formed by the display screen of the second display unit 32 and the upper surface of the camera main body 20. In this case, the first angle detection unit 60 and the second angle detection unit 62 function as the posture detection units that detect the relative posture relationship between the first display unit 22 and the second display unit 32.

The determination unit 64 determines whether the first display unit 22 and the second display unit 32 have a posture relationship (first posture relationship) with which the display screens thereof are simultaneously invisible or have a posture relationship (second posture relationship) with which the display screens thereof are simultaneously visible based on the angle (that is, the relative posture relationship between the first display unit 22 and the second display unit 32) detected by the first angle detection unit 60. In a case where the second display unit 32 is also the variable-angle liquid crystal display device, the determination unit determines whether the first display unit and the second display unit have the first posture relationship or the second posture relationship based on the angles detected by the first angle detection unit 60 and the second angle detection unit 62.

For example, in a case where imaging is performed in a low angle, the user rotates the first display unit 22 that the display screen of the first display unit 22 face upwards in order to easily see the live view image displayed on the first display unit 22.

As the rotation result of the first display unit 22, in a case where the angle detected by the first angle detection unit 60 is 90°, the display screen of the first display unit 22 and the display screen of the second display unit 32 are parallel to each other, and the user can simultaneously view the display screen of the first display unit 22 and the display screen of the second display unit 32.

The present invention is not limited to the case where the angle detected by the first angle detection unit 60 is 90°. The determination unit 64 determines that the first display unit 22 and the second display unit 32 have a second posture relationship with which the display screens thereof are simultaneously visible in a case where the angle is in a set angle range (90°−α to 90°−β), and determines that the first display unit 22 and the second display unit 32 have a first posture relationship with which the display screens thereof are simultaneously invisible in a case where the angle is out of the set angle range. α and β for setting the angle range may be respectively about 30°, or may be customized through user setting.

The determination result (the determination result indicating whether the first display unit 22 and the second display unit 32 have the first posture relationship with which the display screens thereof are simultaneously invisible or have the second posture relationship with which the display screens thereof are simultaneously visible) of the determination unit 64 is output to the CPU 70.

In a case where the digital camera 1 is set in the imaging mode, the display controller 50 usually displays the live view image and camera information items (first camera information items) on the first display unit 22, and displays camera information items (second camera information items) on the second display unit 32. In a case where the determination unit 64 determines that the first display unit 22 and the second display unit 32 have the second posture relationship with which the display screens thereof are simultaneously visible, camera information (hereinafter, referred to as "overlapped information"), among the first camera information items displayed on the first display unit 22, which are overlapped with the second camera information items displayed on the second display unit 32 is removed through display of animation to be described below.

The CPU 70 generally controls the overall operation of the camera main body 20 and driving of optical members of the interchangeable lens 10, and controls the units of the camera main body 20 and the interchangeable lens 10 based on an input from the operation unit 46 including the shutter button 30, a camera control program stored in a read only memory (ROM) (not shown), and various parameters or tables to be used in image processing.

In a case where the imaging mode (still image imaging mode) is set, the CPU 70 causes the units to perform processing for displaying the live view image. That is, the CPU 70 causes the imaging of frames at a frame rate (30 fps, 60 fps) set in advance by the imaging unit 40, and causes the signal processing unit 42 to perform the signal processing on the image data items for each captured frame. The image data items continuously generated by the signal processing unit 42 are sent to the display controller 50. The display controller 50 converts the image data items for each frame which are input in order from the signal processing unit 42 into signals in a display format, and outputs the converted signals to the first display unit 22. Accordingly, the live view image indicating a subject image within an imaging range of the imaging unit 40 is displayed on the first display unit 22, and the user can perform framing in a case where the still image is captured while seeing the live view image displayed on the first display unit 22.

The shutter button 30 is operation means for inputting an imaging instruction, and is constituted by a so-called two-step stroke type switch including "half pushing" and "fully pushing". In the case of the still image imaging mode, the shutter button 30 is half pushed, and thus, an S1-on signal is output. Thereafter, the shutter button is fully pushed by being further pushed while being half pushed, and thus, an S2-on signal is output. The camera main body 20 performs imaging preparation such as automatic focus adjustment and automatic exposure control in a case where the S1-on signal is output, and performs the imaging and recording of the still image in a case where the S2-on signal is output.

In the case of a video imaging mode, the shutter button 30 is fully pushed, and thus, the S2-on signal is output. In this case, the camera main body 20 enters a video recording mode in which the recording of the video is started, and the image processing and recording of the video are performed. Thereafter, the shutter button 30 is fully pushed again, and thus, the S2-on signal is output. In this case, the camera main body 20 enters a standby state, and temporarily stops the recording of the video.

[Embodiment of Display Controller]

Figure 3:
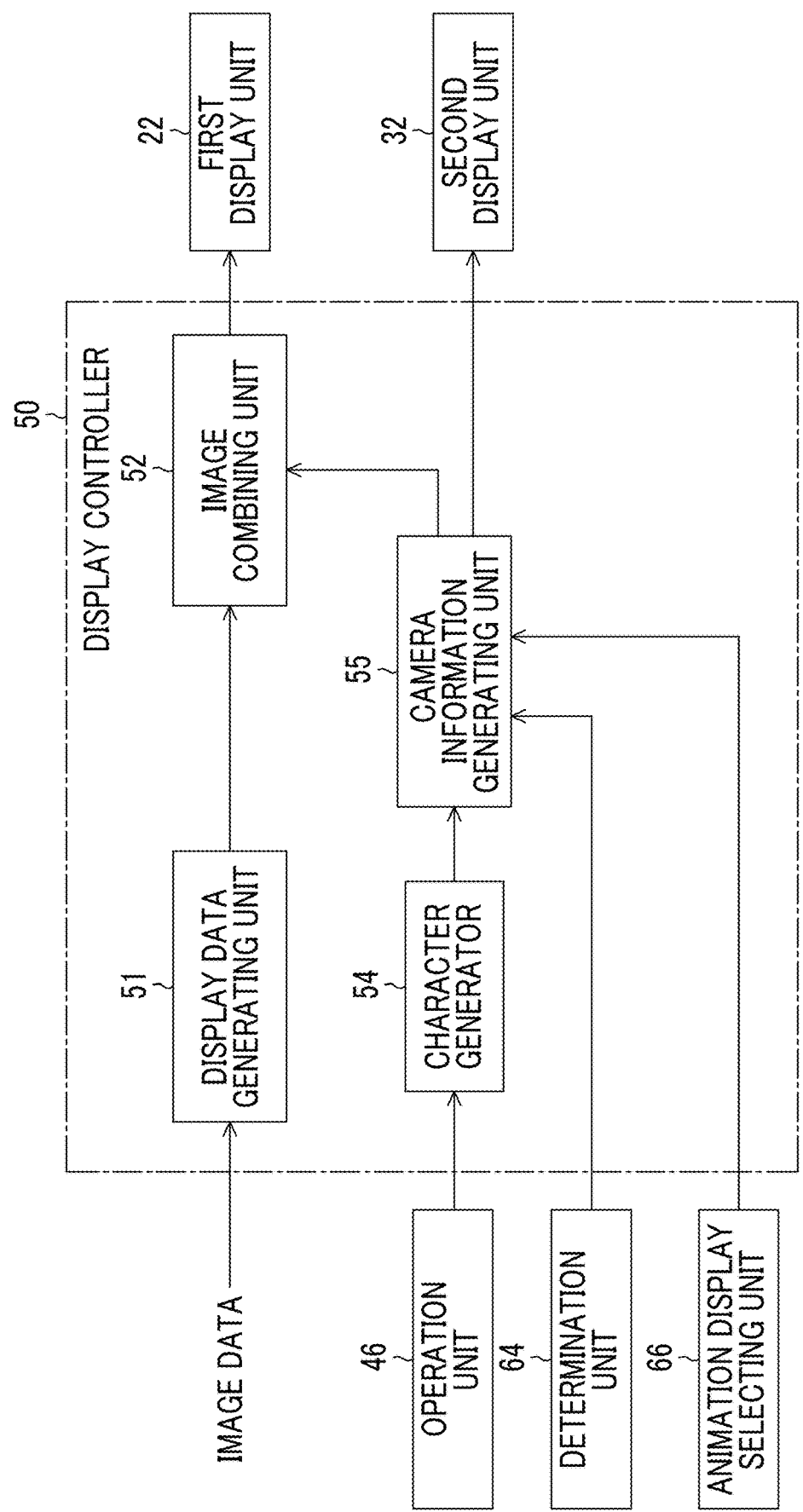
FIG. 3 is a block diagram showing an embodiment of a display controller shown in FIG. 2.

FIG. 3 is a block diagram showing an embodiment of the display controller 50 shown in FIG. 2.

As shown in FIG. 3, the display controller 50 includes a display data generating unit 51, an image combining unit 52, a character generator 54, and a camera information generating unit 55. The display data generating unit 51, the image combining unit 52, the character generator 54, and the camera information generating unit 55 function as a first display controller that displays the live view image on the first display unit 22 and displays the first camera information items on the display screen (preferably, an edge part of the display screen) of the first display unit 22, and the character generator 54 and the camera information generating unit 55 function as a second display controller that displays the second camera information items on the second display unit 32.

The display controller 50 displays the live view image, the captured still image, or the image read out from the memory card on the first display unit 22. However, the operations of the respective units in a case where the live view image is displayed will be described below.

The display controller 50 changes a display form of the camera information items among the live view image and the camera information items displayed on the display screen of the first display unit 22 based on the determination result of the determination unit 64 which is input through the CPU 70 and the selection result of an animation display selecting unit 66.

Here, the animation display selecting unit 66 is a selection unit that selects whether or not to display animation (first animation and second animation) for removing the first camera information items displayed on the display screen of the first display unit 22 on the first display unit 22, and causes the operation unit 46 (cross keys and MENU/OK button) to function as the animation display selecting unit 66. For example, it is possible to select whether or not to display the animation on the first display unit 22 by displaying the menu screen for selecting "animation display" or "no animation display" on the first display unit 22 through the operation of the MENU/OK button, selecting "animation display" or "no animation display" on the menu screen by using the cross keys, and confirming the selected item through the MENU/OK button. A dedicated selection switch may be provided as the animation display selecting unit 66.

In a case where the digital camera 1 is set in the imaging mode, it is possible to display the live view image and the first camera information on the first display unit 22. In this case, whenever the operation unit 46 (display/return button) is pushed, "information display 1" that displays main camera information among the first camera information items, "information display 2" that displays all the first camera information items, "no information display" that does not display the first camera information items, and "custom" that displays the customized first camera information items can be switched in order.

In a case where "custom" is selected, the user operates the operation unit 46 in advance, and thus, it is possible to display only the appropriately selected camera information items as the first camera information items on the first display unit 22. The operation unit 46 including the display/ return button in this case functions as a first camera information selecting unit that selects the first camera information items to be displayed on the first display unit 22.

In a case where "no information display" is selected through the operation of the display/return button, since the first camera information items are not displayed on the first display unit 22, the animation display for removing the first camera information items is not performed irrespective of the selection of the animation display selecting unit 66.

Hereinafter, a case where "no information display" that does not display the first camera information items on the first display unit 22 is not selected and "animation display" is selected by the animation display selecting unit 66 will be described in the present example.

Here, in a case where the determination unit 64 determines that the first display unit 22 and the second display unit 32 have the first posture relationship with which the display screens thereof are simultaneously invisible, the display controller 50 displays the live view image and the first camera information items on the first display unit 22, and displays the second camera information items on the second display unit 32.

Meanwhile, in a case where the determination unit 64 determines that the first display unit 22 and the second display unit 32 have the second posture relationship with which the display screens thereof are simultaneously visible, the display controller 50 displays the animation for removing the first camera information items from the first display unit 22, subsequently displays only the live view image on the first display unit 22, and displays the second camera information items on the second display unit 32.

Initially, a case where the display controller 50 displays the live view image and the first camera information items on the first display unit 22 and displays the second camera information items on the second display unit 32 will be described.

In a case where the imaging mode is set, the display data generating unit 51 receives the RGB image data items for each frame which are captured by the imaging unit 40 and on which the signal processing is performed by the signal processing unit 42 in order, and generates display data items converted into the signals in the display format which correspond to a color dot matrix of the first display unit 22 based on the received image data items for each frame.

Figure 4:
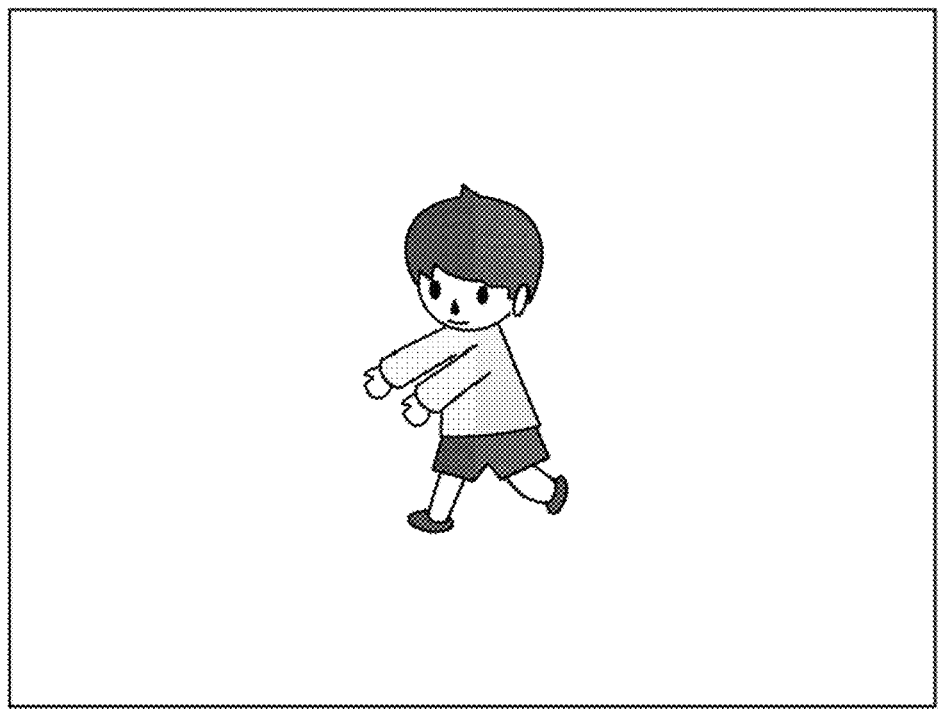
FIG. 4 shows a diagram showing a color live view image displayed on a first display unit.

The display data items generated by the display data generating unit 51 are output to the image combining unit 52. FIG. 4 shows an example of an image corresponding to the display data items generated by the display data generating unit 51.

The character generator 54 has a ROM that stores icons and fonts of characters and numbers indicating the camera information items including various imaging conditions such as the exposure correction value and the shutter speed set by the operation unit 46, reads out various icons and fonts of characters and numbers corresponding to the first camera information items to be displayed on the first display unit 22 and the second camera information items to be displayed on the second display unit 32 from the ROM, and outputs the readout information to the camera information generating unit 55.

The camera information generating unit 55 is a unit that generates first display data items indicating the first camera information items and second display data items indicating the second camera information items which are respectively displayed on the first display unit 22 and the second display unit 32. The camera information generating unit adjusts the sizes of various icons and fonts of characters and numbers corresponding to the first camera information items and the second camera information items which are input from the character generator 54 and the layout within the screen, and generates the first display data items indicating the first camera information items and the second display data items indicating the second camera information items. The first display data items and the second display data items are data items indicating monochrome binary images, respectively.

The camera information generating unit 55 is a unit that outputs animation display data items (video data items) for removing the first camera information items from the first display unit 22 to the image combining unit 52 instead of the first display data items (still image data items) indicating the first camera information items. However, the details of the animation display data items will be described.

The first display data items indicating the first camera information items generated by the camera information generating unit 55 are output to the image combining unit 52, and the second display data items indicating the second camera information items are output to the second display unit 32.

Figure 5:
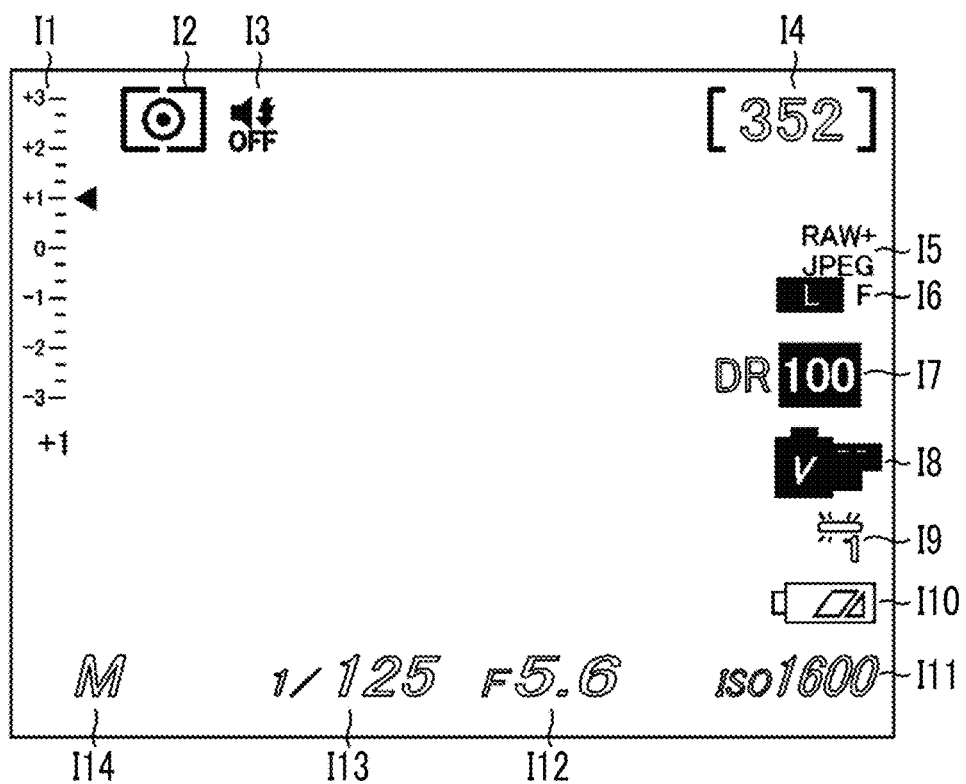
FIG. 5 is a diagram showing first monochrome camera information items displayed on the first display unit.

FIG. 5 is a diagram showing an example of the display screen to be displayed on the first display unit 22 based on the first display data items indicating the first camera information items generated by the camera information generating unit 55.

As shown in FIG. 5, the first camera information items are disposed in the edge part of the display screen of the first display unit 22. By doing this, the first camera information items can be displayed so as not to disturb the visibility of the live view image to be displayed on the first display unit 22.

Figure 6:
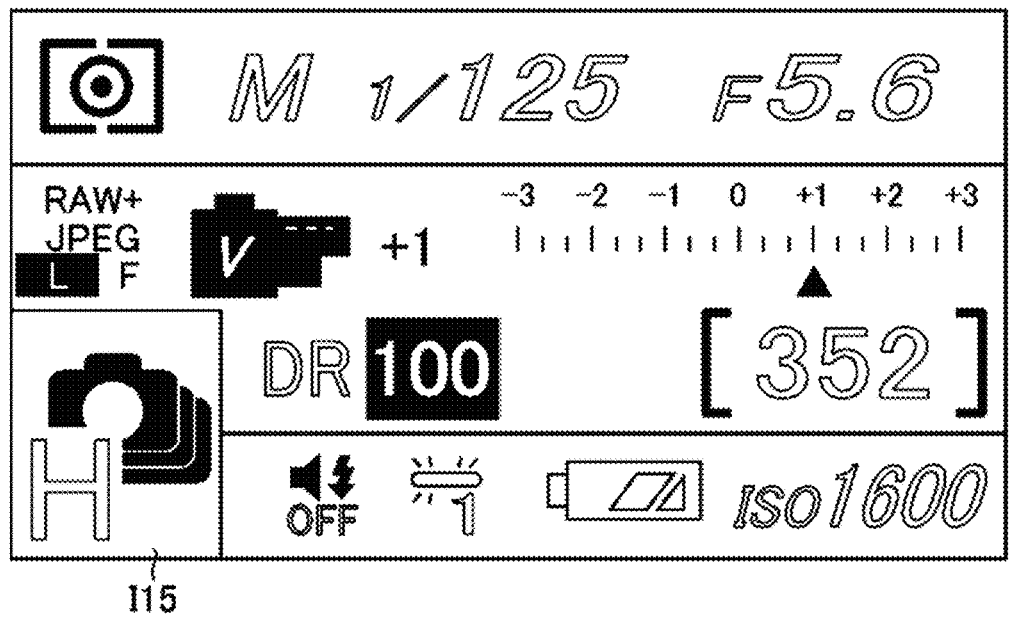
FIG. 6 is a diagram showing second monochrome camera information items displayed on a second display unit.

FIG. 6 is a diagram showing an example of the display screen to be displayed on the second display unit 32 based on the second display data items indicating the second camera information items generated by the camera information generating unit 55.

As shown in FIGS. 5 and 6, the sizes of various icons and fonts of characters and numbers indicating the first camera information items and the second camera information items and the layout within the screen are different for the first display data items indicating the first camera information items and the second display data items indicating the second camera information items.

The meaning of the icons, characters, and numbers indicating various camera information items shown in FIG. 5 are as follows.

I1 . . . exposure correction bar/exposure indicator

I2 . . . icon indicating metering mode (multi metering mode)

I3 . . . icon indicating manner mode (operation sound and flash off)

I4 . . . number of images recordable in memory card (352)

I5 . . . image size (Large (L)) to be recorded/compression rate (Fine (F)) of image to be recorded I6 . . . recording of RAW image and JPEG image I7 . . . dynamic range (100%) of image to be captured I8 . . . icon indicating film simulation (Vivid (V))

I9 . . . icon indicating setting (light source: fluorescent lamp 1) of white balance I10 . . . icon indicating remaining battery capacity I11 . . . ISO sensitivity (ISO 1600)

I12 . . . F number (F5.6)

I13 . . . shutter speed (1/125)

I14 . . . imaging mode (M: Manual)

The display contents of various second camera information items shown in FIG. 6 are substantially the same as the display contents of various camera information items shown in FIG. 5. However, the layout within the screen is different, and the camera information (icon I15) indicating high-speed sequential imaging (High (H)) is added.

In FIG. 3, the image combining unit 52 combines the display data items (see FIG. 4) indicating the color live view image which are input from the display data generating unit 51 with the first monochrome display data items (see FIG. 5) indicating the second camera information items which are input from the camera information generating unit 55. Accordingly, display data items corresponding to an image obtained by superimposing the first monochrome camera information items on the color live view image are generated.

Figure 7:
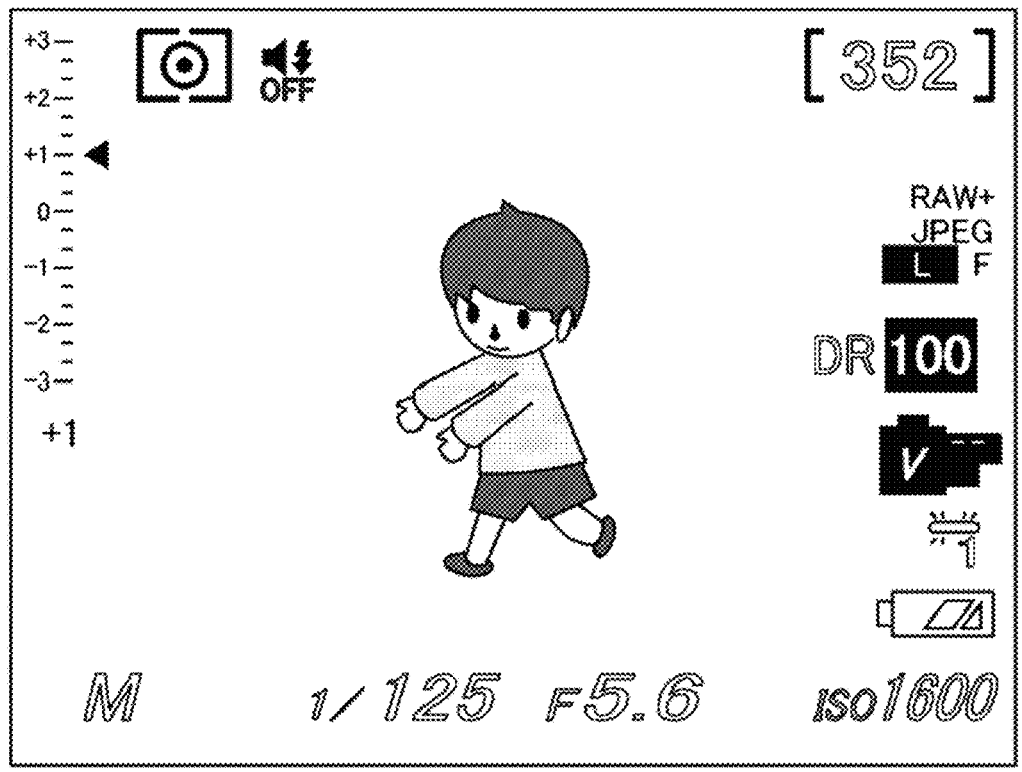
FIG. 7 is a diagram showing a color live view image on which the first monochrome camera information items displayed on the first display unit are superimposed.

The display data items combined by the image combining unit 52 are output to the first display unit 22. The first display unit 22 displays the color live view image obtained by superimposing the monochrome camera information items (FIG. 5) on the color live view image (FIG. 4) based on the input display data items as shown in FIG. 7.

The user can ascertain the imaging range from the color live view image displayed on the first display unit 22, and can consequently perform framing for determining the imaging range. Since the first monochrome camera information items are also displayed on the first display unit 22, the user can check the currently set imaging condition.

Meanwhile, the second display unit 32 displays the monochrome image on which the icons, characters, and numbers indicating various camera information items are disposed as shown in FIG. 6 based on the second display data items indicating the second camera information items input from the camera information generating unit 55. Accordingly, the user can check the currently set imaging condition by the monochrome image (second camera information items) displayed on the second display unit 32.

The user operates the operation unit 46, and thus, it is possible to display only necessary camera information items on the second display unit 32 by appropriately customizing the second camera information items to be displayed on the second display unit 32. The operation unit 46 in this case functions as a second camera information selecting unit that selects the second camera information items to be displayed on the second display unit 32, and the display controller 50 (second display controller) displays the second camera information items selected by the second camera information selecting unit on the second display unit 32.

[Embodiment of Removing of First Camera Information]

Hereinafter, an embodiment in which the first camera information items displayed on the first display unit 22 are removed will be described.

First Embodiment

Figure 8:
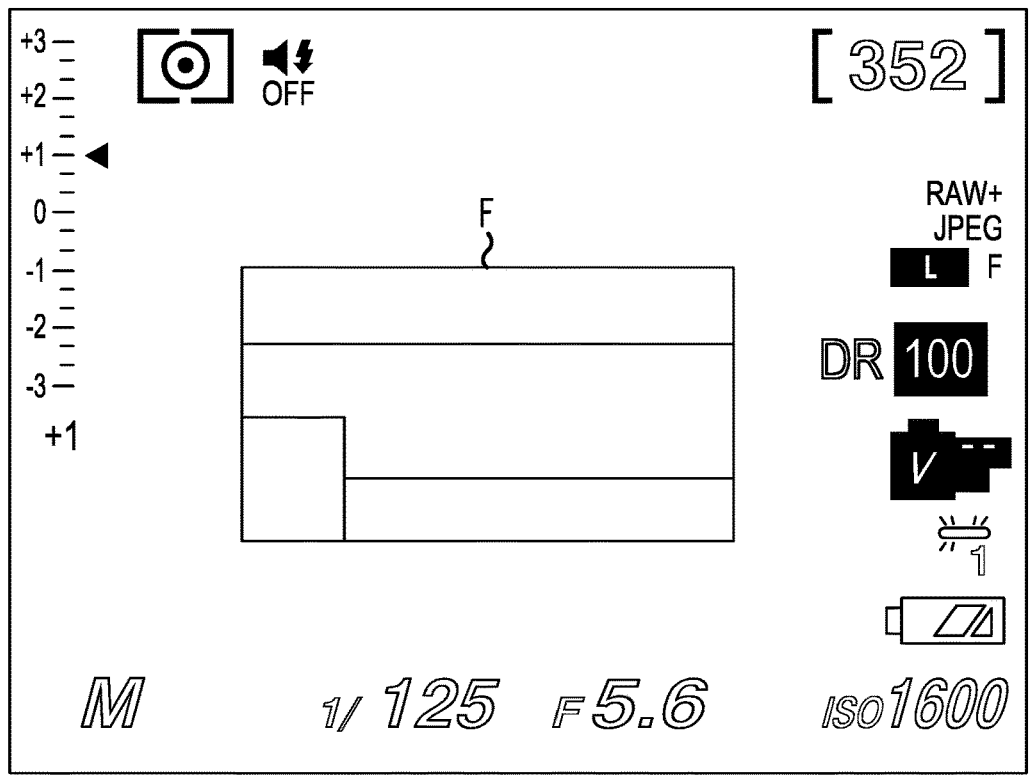
FIG. 8 is a diagram showing a first embodiment in which the first camera information items displayed on the first display unit are removed, and a diagram showing an initial screen of the first display unit at the time of starting the removing of the first camera information items.
Figure 9:
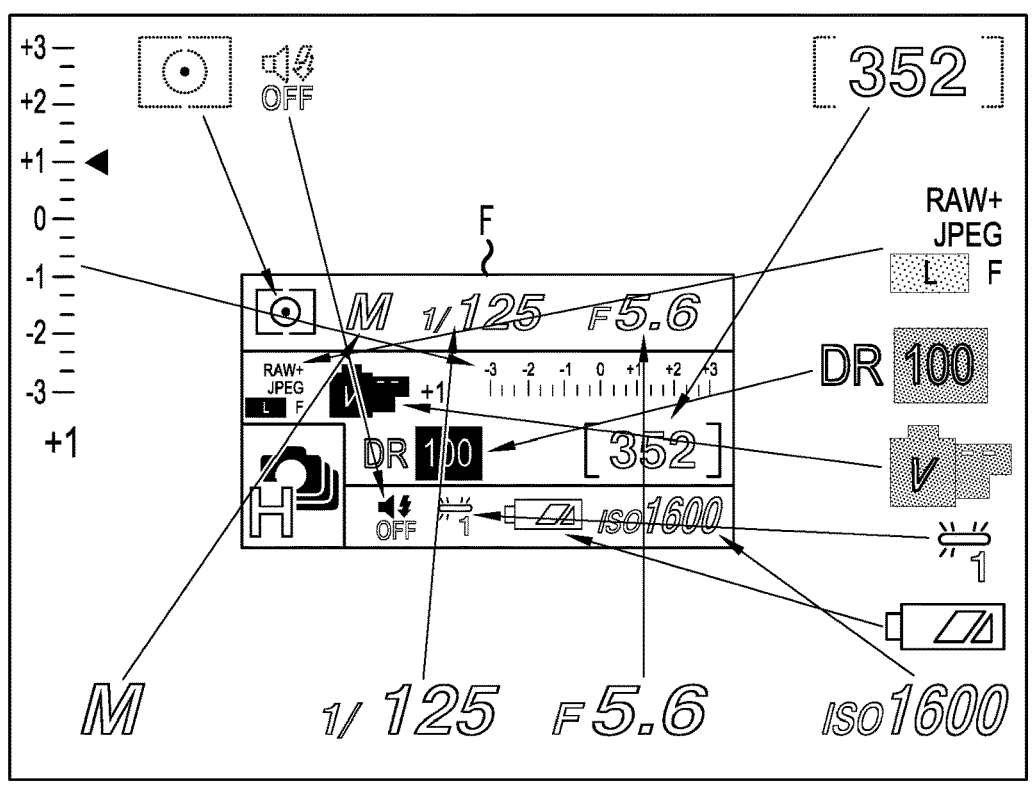
FIG. 9 is a diagram showing the first embodiment in which the first camera information items displayed on the first display unit are removed, and is a diagram showing first animation.
Figure 10:
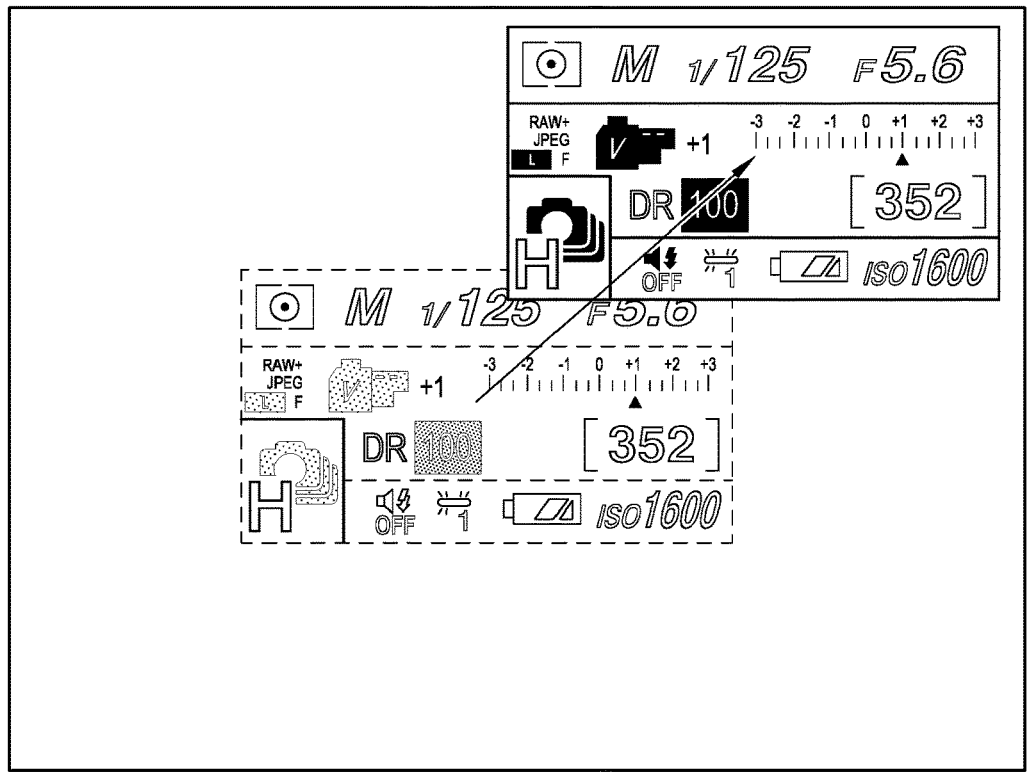
FIG. 10 is a diagram showing the first embodiment in which the first camera information items displayed on the first display unit are removed, and is a diagram showing second animation.

FIGS. 8 to 10 are diagrams showing a first embodiment in which the first camera information items displayed on the first display unit 22 are removed.

In a case where the digital camera 1 is set in the imaging mode and the determination unit 64 determines that the first display unit 22 and the second display unit 32 have the second posture relationship with which the display screens thereof are simultaneously visible, the display controller 50 removes the overlapped information items among the first camera information items displayed on the first display unit 22 which are overlapped with the second camera information items displayed on the second display unit 32 through the display of the animation.

That is, the camera information generating unit 55 shown in FIG. 3 outputs the animation display data items (video data items) for removing the first camera information items from the first display unit 22 to the image combining unit 52 instead of the first display data items (still image data items) indicating the first camera information items shown in FIG. 5.

In this case, the camera information generating unit 55 initially outputs the display data items obtained by adding a display frame F having the same size as that of the display screen of the second display unit 32 to a specific region (central region in the present example) of the display screen of the first display unit 22 as shown in FIG. 9 to the image combining unit 52, as shown in FIG. 8. Accordingly, the first camera information items and the display frame F shown in FIG. 8 are displayed on the first display unit 22.

Subsequently, the camera information generating unit 55 reduces the plurality of overlapped information items (icons, characters, and numbers indicating first various camera information items) disposed in the edge part of the display screen of the first display unit 22 as shown in FIG. 9, and outputs the animation display data items (first animation display data items) indicating animation (first animation) moved to predetermined positions of the display frame F to the image combining unit 52. In this case, the icon I15 set so as to be displayed on only the second display unit 32 is animation which appears without being moved. In a case where such an icon is not present, the appearance animation is not displayed.

Accordingly, the animation (first animation) for gathering the plurality of overlapped information items disposed in the edge part of the display screen of the first display unit 22 in the central region of the display screen of the first display unit 22 is displayed on the first display unit 22, as shown in FIG. 9. Although it has been described that the animation for gathering all the information items displayed on the first display unit 22 is displayed, in a case where there is information that is not moved to the second display unit 32, the display of this information is not changed.

According to the first embodiment, the plurality of overlapped information items displayed in the edge part of the display screen of the first display unit 22 is moved in a direction represented by arrows of FIG. 9 such that the layout of the plurality of overlapped information items gathered in the central region of the display screen of the first display unit 22 matches the layout of the second camera information items displayed on the second display unit 32 shown in FIG. 6. In this case, the exposure correction bar/exposure indicator displayed in a vertical orientation in a left end portion of the display screen of the first display unit 22 is moved by being rotated by 90° in a clockwise direction. In a case where the first animation is displayed, it is preferable that the plurality of overlapped information items disposed in the edge part of the display screen of the first display unit 22 is left while being changed to the display of halftone so as to easily view the movement, but the overlapped information items may be removed.

Subsequently, the camera information generating unit 55 moves the plurality of overlapped information items gathered in the central region of the display screen of the first display unit 22 to the outside of the display screen of the first display unit 22 as shown in FIG. 10, and outputs the animation display data items (second animation display data items) for removing the overlapped information items from the display screen of the first display unit 22 to the image combining unit 52.

Accordingly, the animation (second animation) for removing the overlapped information items from the display screen of the first display unit 22 by moving the plurality of overlapped information items gathered in the central region of the first display unit 22 to the outside of the display screen of the first display unit 22 as shown in FIG. 10 is displayed on the first display unit 22.

In a case where the second animation is displayed, it is preferable that the plurality of overlapped information items gathered in the central region of the display screen of the first display unit 22 is left while being changed to the display of halftone so as to easily view the movement, the overlapped information items may be removed. It is preferable that the direction in which the plurality of overlapped information items gathered in the central region of the display screen of the first display unit 22 is moved to the outside of the display screen of the first display unit 22 is a direction (left-right direction in the present example) from the display screen of the first display unit 22 to the display screen of the second display unit 32. By doing this, a gaze direction of the user is guided to the display screen of the second display unit 32, and thus, the user can recognize that the overlapped information items to be removed from the first display unit 22 are displayed on the second display unit 32.

As stated above, the plurality of overlapped information items displayed on the first display unit 22 is automatically removed from the first display unit 22, and thus, it is easy to see the live view image displayed on the first display unit 22.

Meanwhile, even though the overlapped information items are removed from the first display unit 22, since the overlapped information items displayed on the display screen of the second display unit 32 can be viewed by displaying the overlapped information items on the display screen of the second display unit 32 which is visible simultaneously with the display screen of the first display unit 22 and simply moving the gaze direction, the user is not disturbed. Since the overlapped information items are removed through the display of the animation, it is possible to prevent user's confusion due to sudden removal of the overlapped information items displayed on the first display unit 22.

Only the necessary camera information items can be displayed by appropriately customizing the second camera information items displayed on the second display unit 32. In this case, the display form of the second camera information items displayed on the display screen of the second display unit 32 is changed.

In this case, it is preferable that the display controller 50 (first display controller) changes the layout of the overlapped information items gathered in the central region of the display screen of the first display unit 22 so as to correspond to the layout of the customized second camera information items displayed on the second display unit 32.

It is preferable that a notification unit which notifies that the overlapped information items are removed from the first display unit 22 and the overlapped information items are displayed on the second display unit 32 is provided.

A case where the notification unit notifies that the overlapped information items are removed from the first display unit 22 through "display", a case where the notification unit notifies through "sound", and both of the cases are considered.

A first embodiment of the notification unit which notifies through "display" notifies the user that the overlapped information items are removed from the first display unit 22 by displaying the second camera information items displayed on the second display unit 32 so as to turn on and off the overlapped information items for a period during which the first animation and the second animation are displayed on the first display unit 22 or for a predetermined period after the display of the second animation is ended or changing the brightness of the display screen of the second display unit 32. In this case, the second display unit 32 and the display controller 50 (second display controller) functions as the notification unit which notifies the user that the overlapped information items are removed.

A second embodiment of the notification unit which notifies through "display" includes a lamp (indicator lamp 28 shown in FIG. 1) disposed near the second display unit 32, and notifies the user that the overlapped information items are removed from the first display unit 22 by turning on or turning on and off the indicator lamp 28 for a period during which the first animation and the second animation are displayed on the first display unit 22 or for a predetermined period after the display of the second animation is ended.

Second Embodiment

Figure 11:
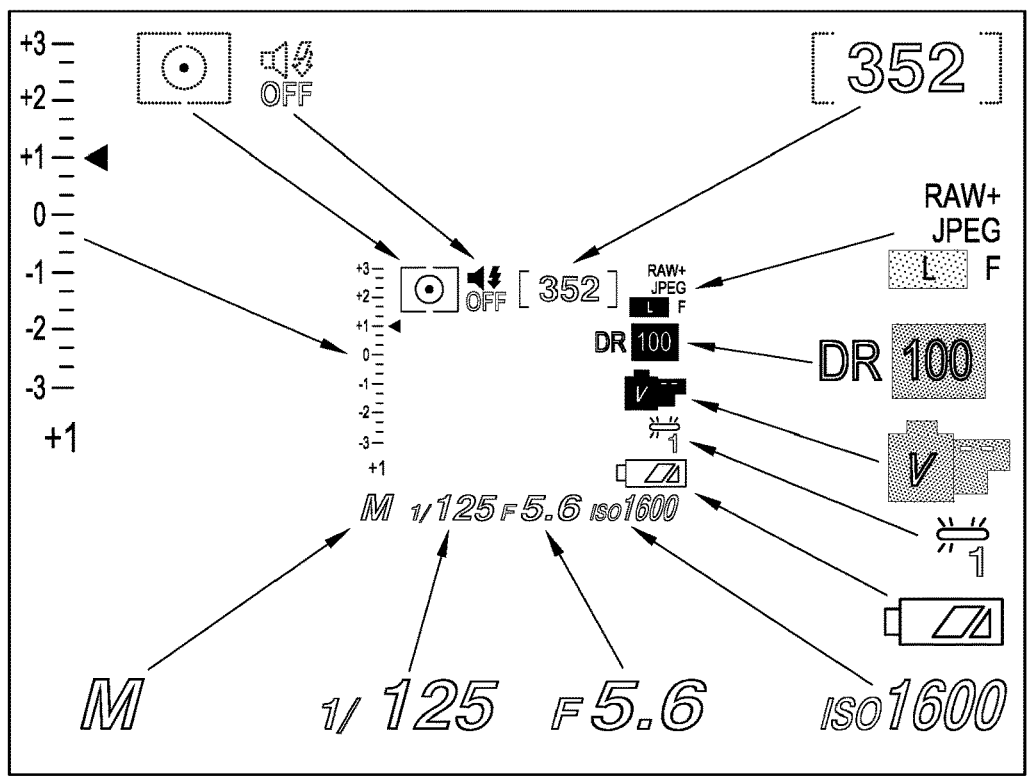
FIG. 11 is a diagram showing a second embodiment in which the first camera information items displayed on the first display unit are removed, and is a diagram showing first animation.
Figure 12:
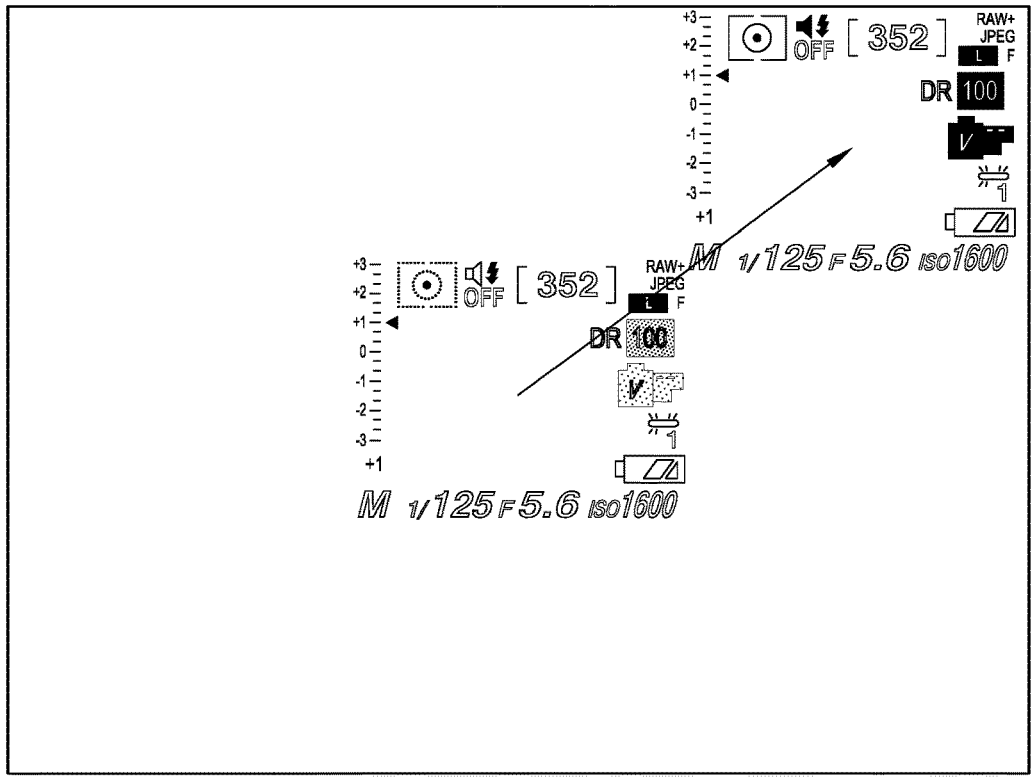
FIG. 12 is a diagram showing the second embodiment in which the first camera information items displayed on the first display unit are removed, and is a diagram showing second animation.

FIGS. 11 and 12 are diagrams showing a second embodiment in which the first camera information items displayed on the first display unit 22 are removed.

The layout of the plurality of overlapped information items gathered in the central region of the display screen of the first display unit 22 is mainly different between the second embodiment shown in FIGS. 11 and 12 and the first embodiment.

That is, in the second embodiment, the camera information generating unit 55 reduces the plurality of overlapped information items disposed in the edge part of the display screen of the first display unit 22 as shown in FIG. 11, and outputs the first animation display data items indicating the first animation for moving the overlapped information items to the central region of the display screen as represented by the arrows to the image combining unit 52.

Accordingly, the first animation for gathering the plurality of overlapped information items disposed in the edge part of the display screen of the first display unit 22 in the central region of the display screen of the first display unit 22 is displayed on the first display unit 22 as shown in FIG. 11.

According to the second embodiment, since the layout of the plurality of overlapped information items gathered in the central region of the display screen of the first display unit 22 matches the layout of the plurality of overlapped information items displayed in the edge part of the display screen of the first display unit 22 and the first animation of the second embodiment is simply moved compared to the first animation of the first embodiment in which the plurality of overlapped information items is complicatedly moved, it is easily see the first animation of the second embodiment. It is assumed that a case where the layouts before and after the plurality of overlapped information items moved by the first animation is moved match each other includes a case where the order of the icons adjacent to each other is not changed.

Subsequently, the camera information generating unit 55 moves the plurality of overlapped information items gathered in the central region of the display screen of the first display unit 22 to the outside of the display screen of the first display unit 22 as shown in FIG. 12, and outputs the second animation display data items to be removed from the display screen of the first display unit 22 to the image combining unit 52.

Accordingly, the second animation for removing the overlapped information items from the display screen of the first display unit 22 by moving the plurality of overlapped information items gathered in the central region of the first display unit 22 to the outside of the display screen of the first display unit 22 as shown in FIG. 12 is displayed on the first display unit 22.

Third Embodiment

Figure 13:
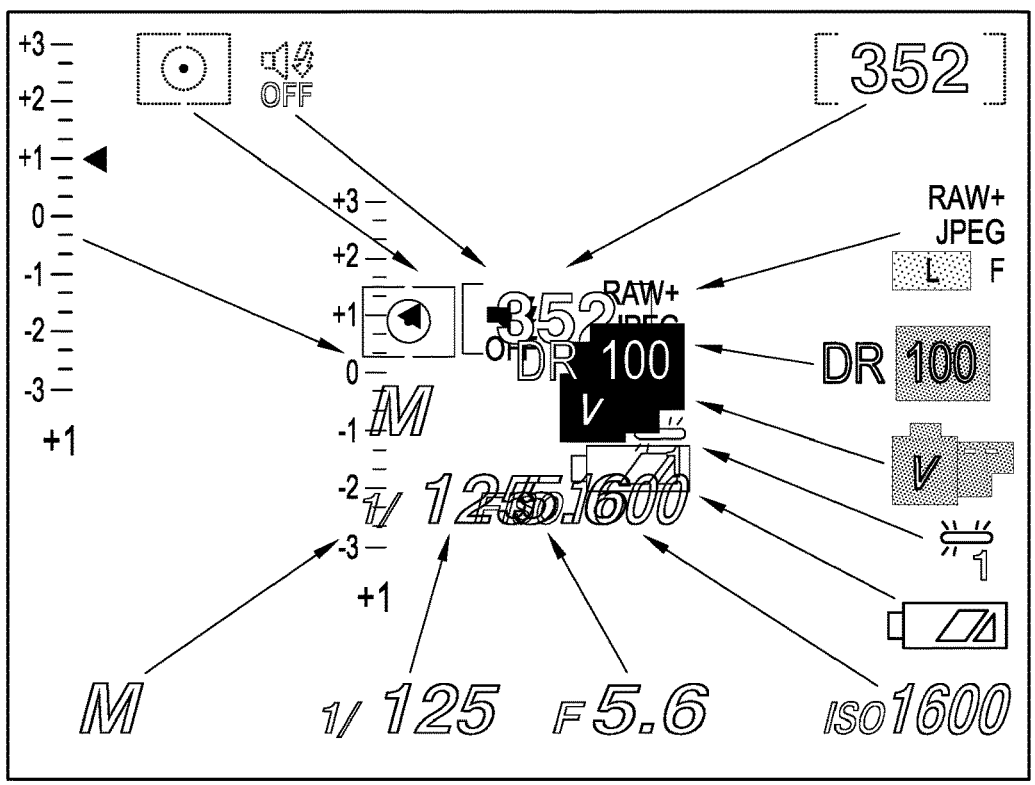
FIG. 13 is a diagram showing a third embodiment in which the first camera information items displayed on the first display unit are removed, and is a diagram showing first animation.
Figure 14:
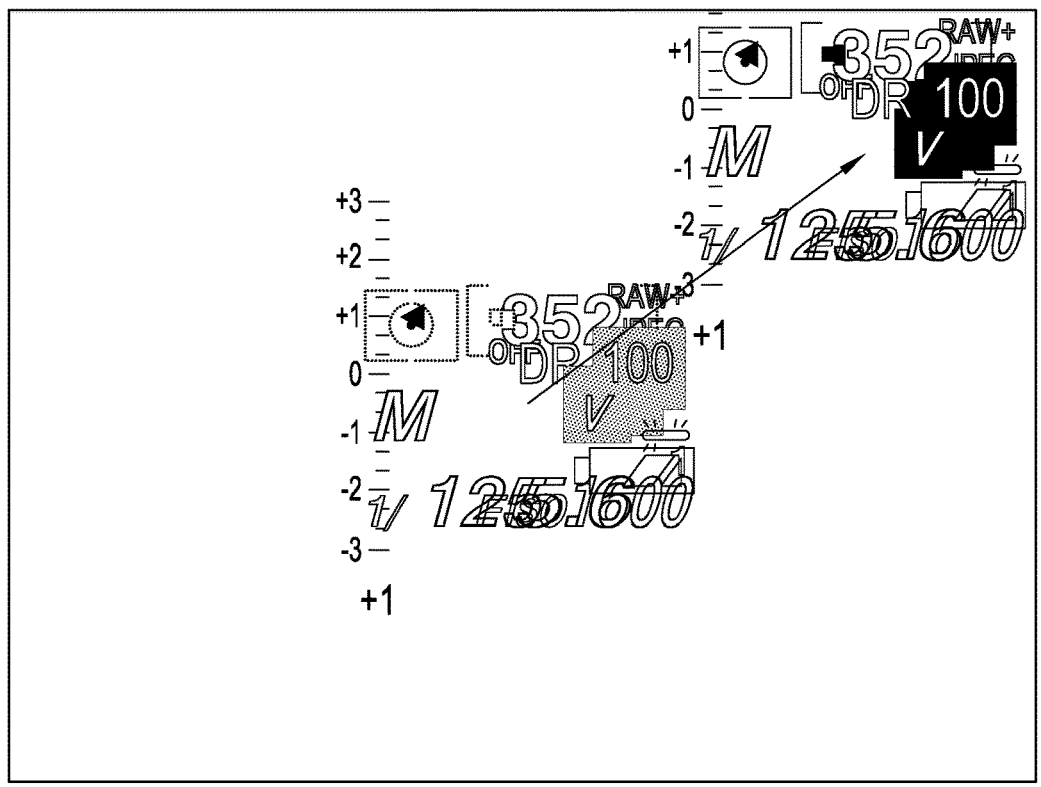
FIG. 14 is a diagram showing the third embodiment in which the first camera information items displayed on the first display unit are removed, and is a diagram showing second animation.

FIGS. 13 and 14 are diagrams showing a third embodiment in which the first camera information items displayed on the first display unit 22 are removed.

A third embodiment shown in FIGS. 13 and 14 is different from the second embodiment in that the plurality of overlapped information items gathered in the central region of the display screen of the first display unit 22 is not reduced.

That is, in the third embodiment, the camera information generating unit 55 does not reduce the plurality of overlapped information items disposed in the edge part of the display screen of the first display unit 22 as shown in FIG. 13, and outputs the first animation display data items indicating the first animation for moving the overlapped information items to the central region of the display screen to the image combining unit 52 as represented by the arrows.

Accordingly, the first animation for gathering the plurality of overlapped information items disposed in the edge part of the display screen of the first display unit 22 in the central region of the display screen of the first display unit 22 is displayed on the first display unit 22 as shown in FIG. 13.

In the third embodiment, since the plurality of overlapped information items disposed in the edge part of the display screen of the first display unit 22 is not reduced and is gathered in the central region of the display screen of the first display unit 22, the plurality of overlapped information items is displayed so as to be overlapped.

Subsequently, the camera information generating unit 55 moves the plurality of overlapped information items gathered in the central region of the display screen of the first display unit 22 to the outside of the display screen of the first display unit 22 as shown in FIG. 14, and outputs the second animation display data items for removing the overlapped information items from the display screen of the first display unit 22 to the image combining unit 52.

Accordingly, the second animation for removing the overlapped information items from the display screen of the first display unit 22 by moving the plurality of overlapped information items gathered in the central region of the display screen of the first display unit 22 to the outside of the display screen of the first display unit 22 as shown in FIG. 14 is displayed on the first display unit 22.

According to the third embodiment, it is not necessary to reduce the plurality of overlapped information items (icons or the like), and thus, it is possible to reduce a load of a camera system compared to the second embodiment. Since the plurality of overlapped information items disposed in the edge part of the display screen of the first display unit 22 is not reduced and is gathered in the central region of the display screen of the first display unit 22, the plurality of overlapped information items is displayed so as to be overlapped. However, since it is not necessary to individually view the plurality of overlapped information items after the overlapped information items are gathered in the central region of the display screen, the user is not disturbed even though the plurality of overlapped information items is displayed so as to be overlapped.

Fourth Embodiment

Figure 15:
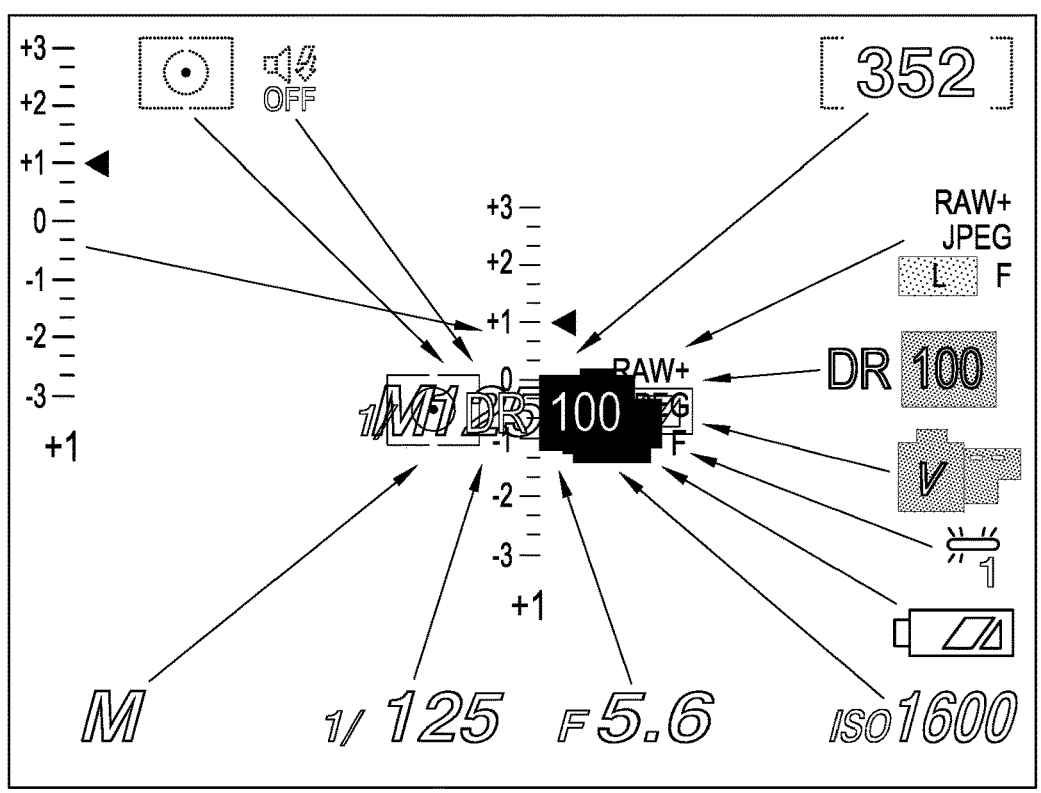
FIG. 15 is a diagram showing a fourth embodiment in which the first camera information items displayed on the first display unit are removed, and is a diagram showing first animation.
Figure 16:
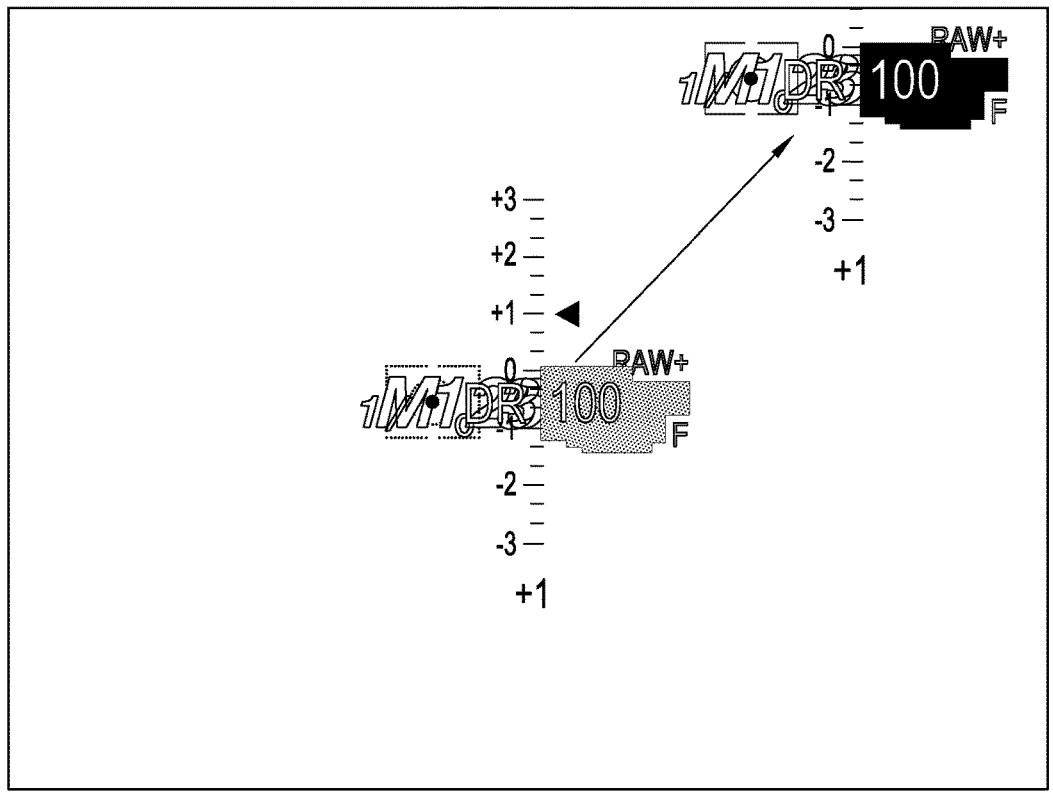
FIG. 16 is a diagram showing the fourth embodiment in which the first camera information items displayed on the first display unit are removed, and is a diagram showing second animation.

FIGS. 15 and 16 are diagrams showing a fourth embodiment in which the first camera information items displayed on the first display unit 22 are removed.

The fourth embodiment shown in FIGS. 15 and 16 is in common with the third embodiment in that the plurality of overlapped information items gathered in the central region of the display screen of the first display unit 22 is not reduced. However, a specific region of the display screen of the first display unit 22 in which the plurality of overlapped information items disposed in the edge part of the display screen of the first display unit 22 is gathered is different between the fourth embodiment and the third embodiment.

That is, in the fourth embodiment, the camera information generating unit 55 does not reduce the plurality of overlapped information items disposed in the edge part of the display screen of the first display unit 22 as shown in FIG. 15, and outputs the first animation display data items indicating the first animation for moving the overlapped information items to the central region of the display screen as represented by the arrows to the image combining unit 52. In this case, the first animation display data items indicating the first animation for moving the overlapped information items to the central region narrower than that in the third embodiment shown in FIG. 13 are output to the image combining unit 52.

Accordingly, the first animation for gathering the plurality of overlapped information items disposed in the edge part of the display screen of the first display unit 22 in the narrower central region of the display screen of the first display unit 22 is displayed on the first display unit 22 as shown in FIG. 15.

In the fourth embodiment, since the plurality of overlapped information items disposed in the edge part of the display screen of the first display unit 22 is not reduced and is gathered in the narrower central region of the display screen of the first display unit 22, the icon information items indicating the overlapped information items are displayed so as to be overlapped at high density compared to the third embodiment.

Subsequently, the camera information generating unit 55 outputs the second animation display data items for removing the overlapped information items from the display screen of the first display unit 22 by moving the plurality of overlapped information items gathered in the central region of the display screen of the first display unit 22 to the outside of the display screen of the first display unit 22 as shown in FIG. 16 to the image combining unit 52.

Accordingly, the second animation for removing the overlapped information items from the display screen of the first display unit 22 by moving the plurality of overlapped information items gathered in the central region of the first display unit 22 to the outside of the display screen of the first display unit 22 as shown in FIG. 16 is displayed on the first display unit 22.

According to the fourth embodiment, since the contrast of the overlapped information items gathered in the central region of the display screen of the first display unit 22 becomes high, the visibility of the user is increased, and it is easy to view the movement.

Fifth Embodiment

Figure 17:
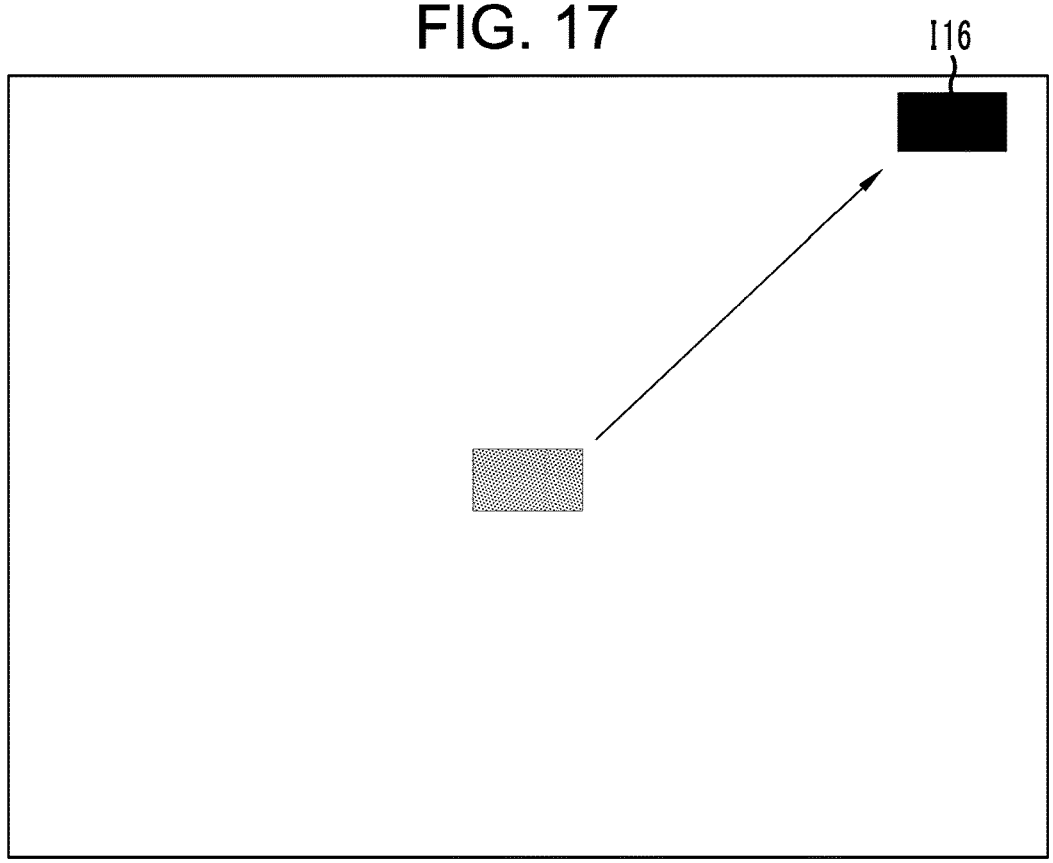
FIG. 17 is a diagram showing a fifth embodiment in which the first camera information items displayed on the first display unit are removed, and is a diagram showing second animation.

FIG. 17 is a diagram showing a fifth embodiment in which the first camera information items displayed on the first display unit 22 are removed, and particularly, shows the display of the second animation.

The fifth embodiment shown in FIG. 17 is in common with the fourth embodiment shown in FIG. 15 in that the first animation for gathering the plurality of overlapped information items disposed in the edge part of the display screen of the first display unit 22 in the central region of the display screen is displayed on the first display unit 22, but is different from the fourth embodiment in that the second animation for removing the overlapped information items from the display screen of the first display unit 22 by moving the gathered overlapped information items to the outside of the display screen of the first display unit 22 is used.

That is, in the fifth embodiment, the camera information generating unit 55 replaces the plurality of overlapped information items gathered in the central region of the display screen of the first display unit 22 as shown in FIG. 15 with a rectangular icon I16 as shown in FIG. 17, and outputs the second animation display data items for removing the overlapped information items from the display screen of the first display unit 22 by moving the icon I16 to the outside of the display screen of the first display unit 22 to the image combining unit 52.

Accordingly, the second animation for removing the overlapped information items from the display screen of the first display unit 22 by moving the icon I16 displayed in the central region of the first display unit 22 to the outside of the display screen of the first display unit 22 as shown in FIG. 17 is displayed on the first display unit 22.

Since the plurality of overlapped information items gathered in the central region of the display screen of the first display unit 22 does not have meaning as the camera information items, the plurality of overlapped information items may be replaced with the icon I16, and the icon I16 may be moved to the outside of the display screen, and may be removed in the fifth embodiment. In a case where the second animation is displayed, it is preferable that the rectangular icon I16 of the central region of the display screen of the first display unit 22 is left while being changed to the display of halftone so as to easily view the movement of the icon 116, but this icon may be removed.

According to the fifth embodiment, since the plurality of overlapped information items is replaced with the rectangular icon I16 and the icon I16 is moved, it is easy to view the movement of the icon I16.

Sixth Embodiment

Figure 18:
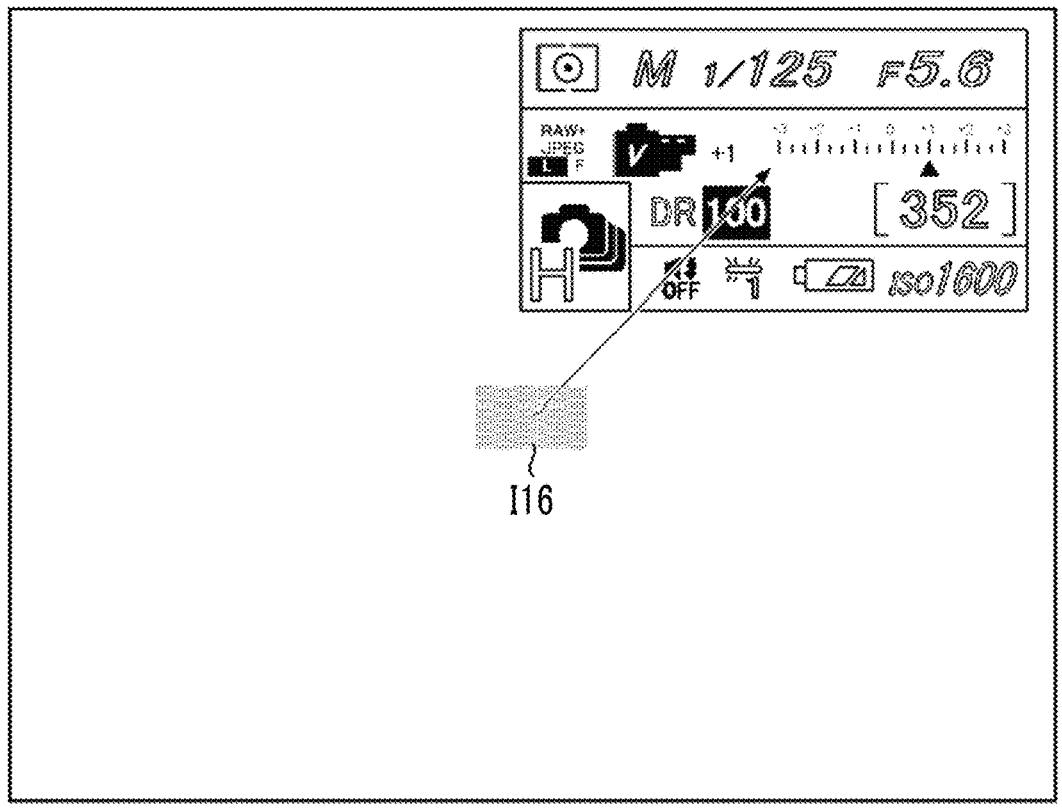
FIG. 18 is a diagram showing a sixth embodiment in which the first camera information items displayed on the first display unit are removed, and is a diagram showing second animation.

FIG. 18 is a diagram showing a sixth embodiment in which the first camera information items displayed on the first display unit 22 are removed, and particularly, shows the display of the second animation.

The sixth embodiment shown in FIG. 18 is in common with the fifth embodiment shown in FIG. 17 in that the plurality of overlapped information items gathered in the central region of the display screen of the first display unit 22 are replaced with the rectangular icon, but is different from the fifth embodiment in that the second animation for removing the overlapped information items from the display screen of the first display unit 22 by moving the rectangular icon to the outside of the display screen of the first display unit 22 is used.

That is, in the sixth embodiment, the camera information generating unit 55 replaces the plurality of overlapped information items gathered in the central region of the display screen of the first display unit 22 as shown in FIG. 15 with the rectangular icon I16 as shown in FIG. 18, and the icon I16 is moved to the outside of the display screen of the first display unit 22. The icon I16 is gradually enlarged while moving the icon, and is changed in the same display form as that of the display screen of the second display unit 32. Thereafter, the second animation display data items for removing the overlapped information items from the display screen of the first display unit 22 are output to the image combining unit 52.

Accordingly, the rectangular icon I16 displayed in the central region of the first display unit 22 is gradually enlarged while moving the icon I16 to the outside of the display screen of the first display unit 22 as shown in FIG. 18, and is changed in the same display form as that of the display screen of the second display unit 32. Thereafter, the second animation for removing the overlapped information items from the display screen of the first display unit 22 is displayed on the first display unit 22.

According to the sixth embodiment, since the plurality of overlapped information items is replaced with the rectangular icon I16, and is changed in the same display form as that of the display screen of the second display unit 32 while moving the icon I16, the user can easily recognize the display of a movement destination.

Meanwhile, in a state in which the overlapped information items are removed from the first display unit 22 and only the live view image is displayed on the display screen of the first display unit 22 as shown in FIG. 4, in a case where the determination unit 64 determines that the first display unit 22 and the second display unit 32 have the first posture relationship with which the display screens thereof are simultaneously invisible by rotating the first display unit 22, it is desirable that the display controller 50 immediately displays the removed overlapped information items in the edge part of the display screen of the first display unit 22. By doing this, even though the removed overlapped information items are immediately returned, since the display is familiar, a sense of incompatibility is not given to the user.

The display controller 50 may display animation on the first display unit 22 by reversely playing the first animation and the second animation, and may return the removed overlapped information items.

Although the display of the live view image is omitted in FIGS. 8 to 18 for the sake of convenience in description, it is preferable that the live view image is displayed during the display of the first animation and the second animation. Accordingly, it is possible to continuously display the live view image without stopping the live view image.

The display of the live view image may be temporarily stopped during the display of the first animation and the second animation. In this case, it is easy to see the first animation and the second animation, and thus, the user can recognize that the overlapped information items are removed. Particularly, it is effective in a case where the first animation and the second animation run for a short time.

[Second Embodiment of Digital Camera]

Figure 19:
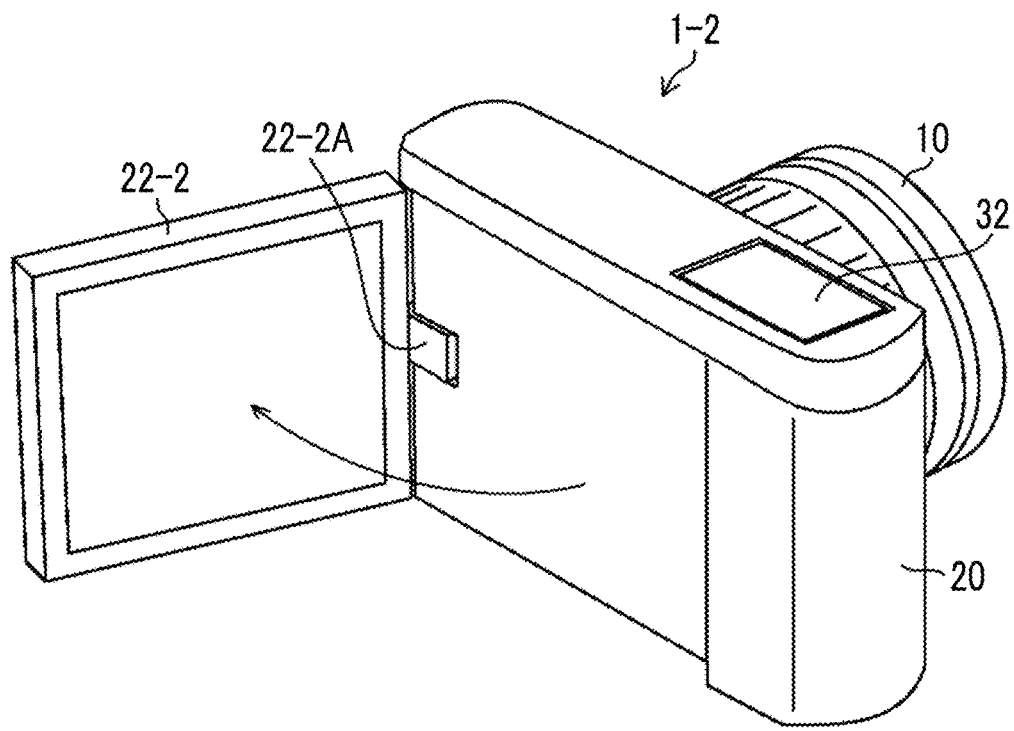
FIG. 19 is an external view showing a second embodiment of the digital camera according to the present invention, and is a perspective view in a case where the digital camera is diagonally viewed from behind.
Figure 20:
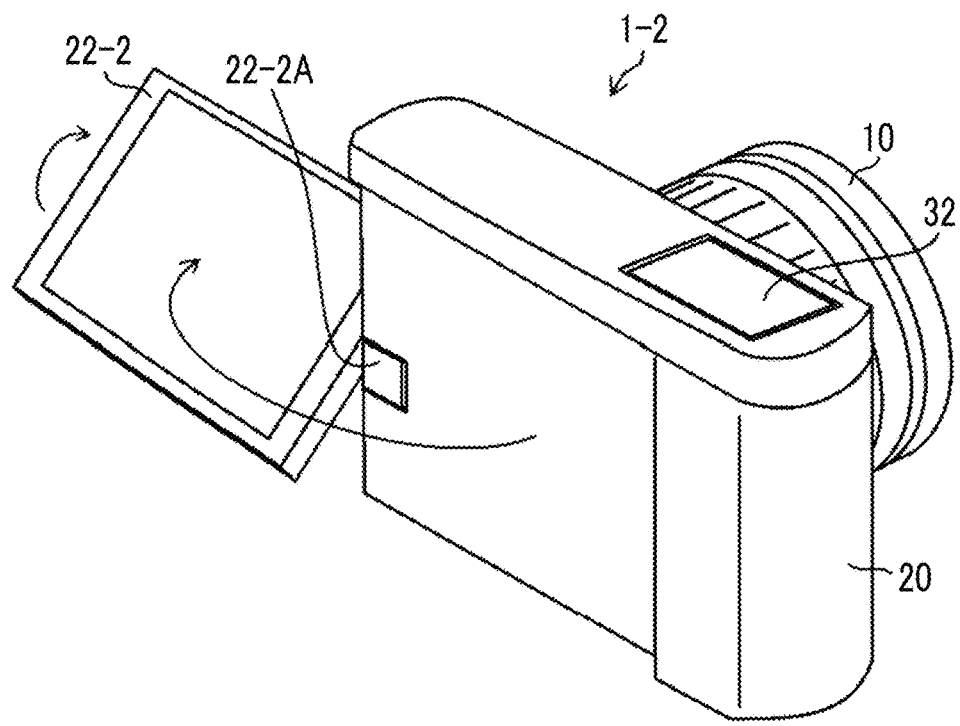
FIG. 20 is an external view showing the second embodiment of the digital camera according to the present invention, and is a diagram showing a case where a posture of the first display unit is different from a posture of the second display unit shown in FIG. 19.

FIGS. 19 and 20 are external views showing a second embodiment of the digital camera according to the present invention, and are perspective views in a case where the digital camera is diagonally viewed from behind. In FIGS. 19 and 20, portions in common with those in the digital camera 1 of the first embodiment shown in FIG. 1 will be assigned the same references, and the detailed description thereof will be omitted.

A digital camera 1-2 of the second embodiment shown in FIGS. 19 and 20 is mainly different from the digital camera 1 of the first embodiment shown in FIG. 1 in that a rotation mechanism of a first display unit 22-2 is provided.

As shown in FIG. 19, a first plate-shaped display unit 22-2 which is a transmissive type color liquid crystal display device is provided on the rear surface of the camera main body 20.

The first display unit 22-2 is a variable-angle liquid crystal display device rotatable around the camera main body 20 in an axial direction of an axis (vertical axis) of the camera main body 20 in a machine direction and an axial direction of an axis (lateral axis) thereof in a horizontal direction by an orthogonal two-axis hinge 22-2A. In a case where the first display unit is rotated by 180° in a direction (axial direction of the vertical axis of the camera main body 20) of an arrow as shown in FIG. 19, the display screen of the first display unit 22-2 can be parallel to the rear surface of the camera main body 20.

In a state in which the first display unit 22-2 is opened as shown in FIG. 20, the first display unit 22-2 can be rotated by 360° in the axial direction of the lateral axis of the hinge 22-2A, and thus, it is possible to easily see the display screen at the time of framing in low angle or high angle.

In the case of the digital camera 1-2 of the second embodiment, the relative posture relationship between the display screen of the first display unit 22-2 and the display screen of the second display unit 32 can be detected by rotation angles in the axial directions of the two orthogonal axes of the hinge 22-2A. For example, the first display unit 22-2 is rotated by 180° in the axial direction of the vertical axis of the hinge 22-2A from the state in which the first display unit 22-2 is closed. In a case where the first display unit 22-2 is rotated by 90° in the axial direction (a direction in which the display screen faces upwards) of the lateral axis of the hinge 22-2A, the display screen of the first display unit 22-2 and the display screen of the second display unit 32 are parallel to each other, and orientations (a direction of a short side of the display screen) of both the display screens are the same direction. In this case, it is possible to view the display screen of the second display unit 32 by merely moving the gaze direction from a state in which the user sees the display screen of the first display unit 22-2.

In the case of the digital camera 1-2 of the second embodiment, it is preferable that the determination unit 64 shown in FIG. 2 determines whether the first display unit 22-2 and the second display unit 32 have the first posture relationship with which the display screens thereof are simultaneously invisible or have the second posture relationship with which the display screens thereof are simultaneously visible based on detection outputs (that is, the relative posture relationship between the first display unit 22-2 and the second display unit 32) of an angle detection unit (now shown) that detects an angle of the first display unit 22-2, that is, an angle detection unit that detects an angle in the axial direction of the vertical axis the hinge 22-2A and an angle in the axial direction of the lateral axis thereof instead of the first angle detection unit 60.

[Third Embodiment of Digital Camera]

Figure 21:
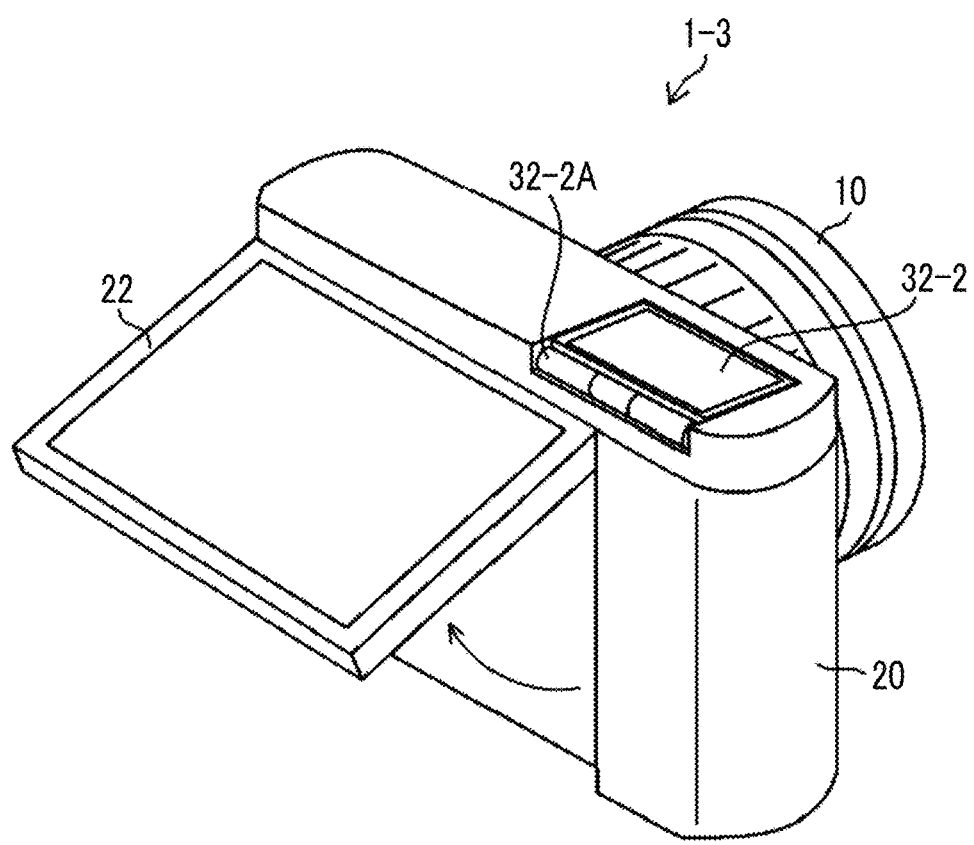
FIG. 21 is an external view showing a third embodiment of the digital camera according to the present invention, and is a perspective view in a case where the digital camera is diagonally viewed from behind.
Figure 22:
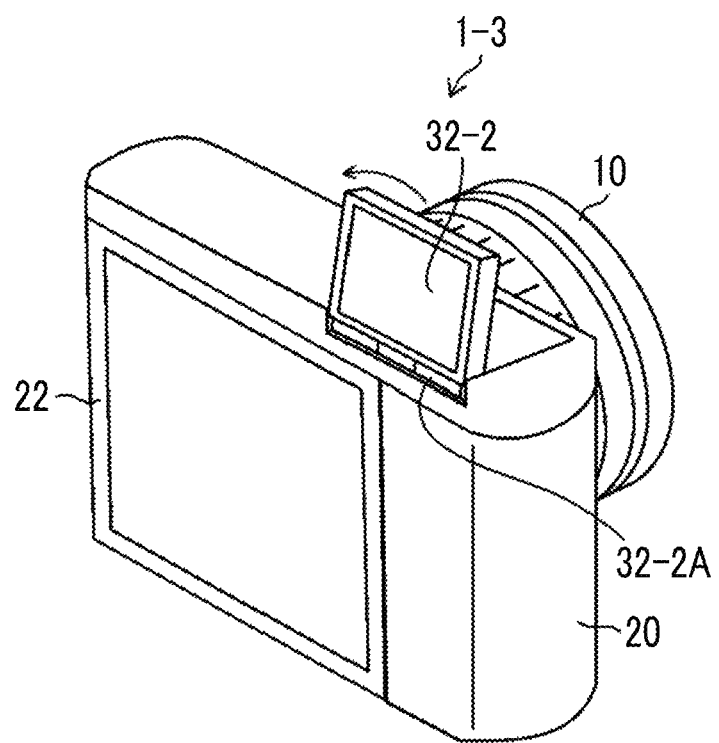
FIG. 22 is an external view showing a third embodiment of the digital camera according to the present invention, and is a diagram showing a case where the postures of the first display unit and the second display unit are different from the posture of the second display unit shown in FIG. 21.

FIGS. 21 and 22 are external views showing a third embodiment of the digital camera according to the present invention, and are perspective views in a case where the digital camera is diagonally viewed from behind. In FIGS. 21 and 22, portions in common with those in the digital camera 1 of the first embodiment shown in FIG. 1 will be assigned the same references, and the detailed description thereof will be omitted.

A digital camera 1-3 of the third embodiment shown in FIGS. 21 and 22 is mainly different from the digital camera 1 of the first embodiment shown in FIG. 1 in that a second display unit 32-2 is also provided so as to be rotatable around the camera main body 20.

As shown in FIGS. 21 and 22, the plate-shaped second display unit 32-2 which is a reflective type monochrome liquid crystal display device is provided on the upper surface of the camera main body 20.

The second display unit 32-2 is a variable-angle liquid crystal display device provided so as to be rotatable around the camera main body 20 by a hinge 32-2A.

FIG. 21 shows a state in which the display screen of the first display unit 22 is rotated in a direction (a direction of an upper surface of the camera main body 20) in which the display screen faces upwards and an angle of the display screen of the second display unit 32-2 with respect to the upper surface of the camera main body 20 is 0° (the upper surface of the camera main body 20 is flush with the display screen of the second display unit 32-2).

Meanwhile, FIG. 22 shows a state in which an angle of the display screen of the first display unit 22 with respect to the rear surface of the camera main body 20 is 0° (the rear surface of the camera main body 20 is flush with the display screen of the first display unit 22) and an angle of the second display unit 32-2 with respect to the upper surface of the camera main body 20 is about 90° (the rear surface of the camera main body 20 is substantially parallel to the display screen of the second display unit 32-2).

In a case where the relative posture relationship between the display screen of the first display unit 22 and the display screen of the second display unit 32 is the posture relationship shown in FIG. 21 or 22, it is possible to view the display screen of the second display unit 32-2 by merely moving the gaze direction from a state in which the user sees the display screen of the first display unit 22.

As stated above, in the case of the digital camera 1-3 of the third embodiment in which the second display unit 32-2 as well as the first display unit 22 is also rotated, it is necessary to provide the second angle detection unit 62 (the second angle detection unit 62 represented by a dotted line in FIG. 2) that detects the angle of the second display unit 32-2 as shown in FIG. 2. It is preferable that the determination unit 64 shown in FIG. 2 determines whether the first display unit 22 and the second display unit 32-2 have the first posture relationship with which the display screens thereof are simultaneously invisible or have the second posture relationship with which the display screens thereof are simultaneously visible based on the detection outputs (the relative posture relationship between the first display unit 22 and the second display unit 32-2) of the first angle detection unit 60 that detects the angle of the display screen of the first display unit 22 and the second angle detection unit 62 that detects the angle of the display screen of the second display unit 32-2.

[Display Method of Digital Camera]

Hereinafter, a display method of a digital camera according to the present invention will be described.

Figure 23:
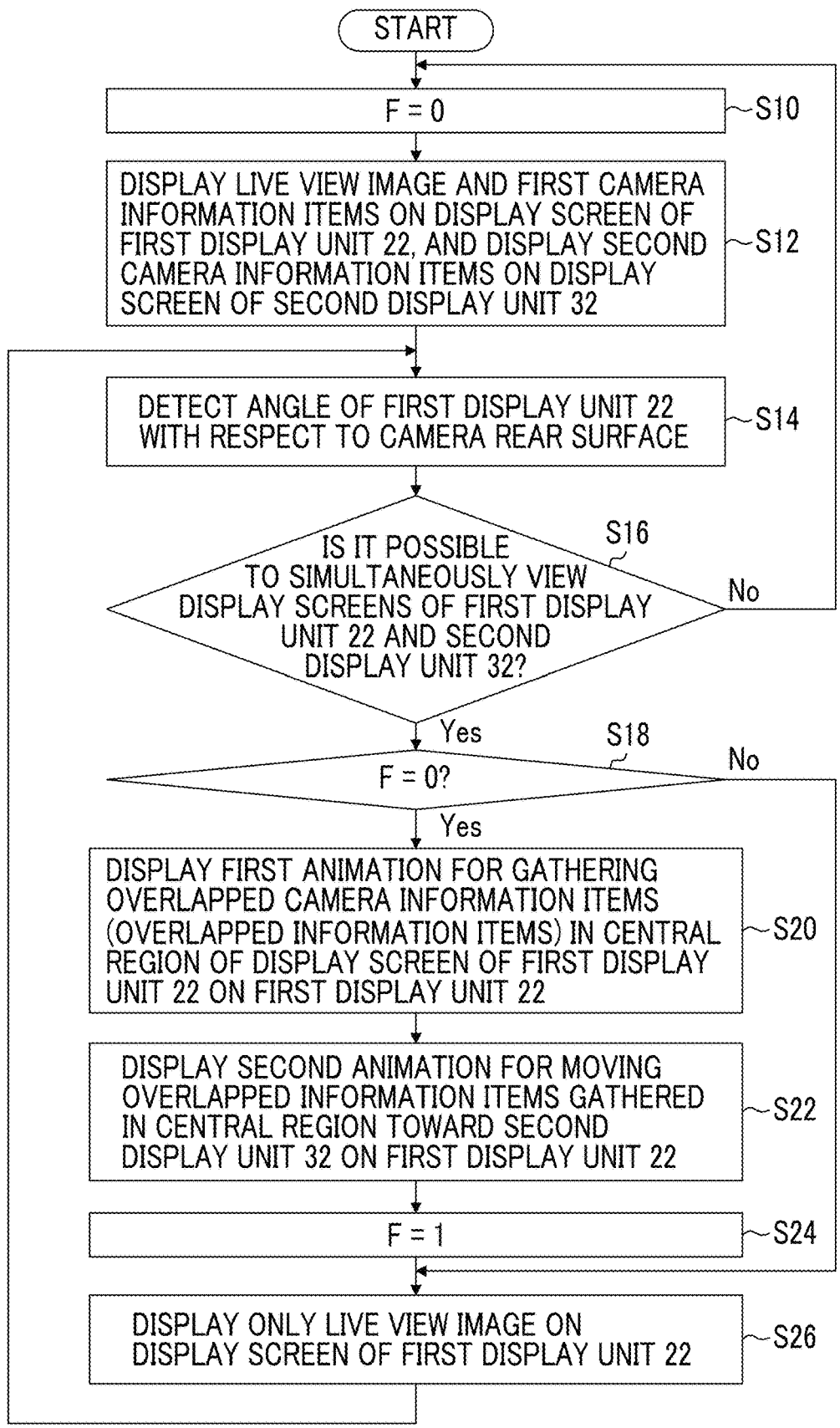
FIG. 23 is a flowchart showing an embodiment of a display method of a digital camera according to the present invention.

FIG. 23 is a flowchart showing an embodiment of the display method of a digital camera according to the present invention, and shows the display method of a digital camera 1 of the first embodiment shown in FIG. 1.

As shown in FIG. 23, a flag F (F=0) indicating the display form of the first display unit is a first display form is set as a flag F indicating the display form of the first display unit 22 in a case where the imaging mode is set (step S10). Here, the first display form refers to a normal display form in which the first camera information items are displayed so as to be superimposed on the live view image displayed on the display screen of the first display unit 22.

Subsequently, the display controller 50 displays the live view image and the first camera information items on the first display unit 22 (displays these information items in the normal display form), and displays the second camera information items on the second display unit 32 (step S12, FIGS. 6 and 7).

Hereinafter, the first angle detection unit 60 detects the angle of the display screen of the first display unit 22 with respect to the camera rear surface (step S14).

The determination unit 64 determines whether or not the first display unit 22 and the second display unit 32 have the second posture relationship with which the display screens thereof are simultaneously visible based on the angle detected by the first angle detection unit 60 (step S16). In a case where the determination unit 64 determines that the first display unit 22 and the second display unit 32 have the first posture relationship with which the display screens thereof are simultaneously invisible (in the case of "No"), the process returns to step S10, and the display is continuously performed in the normal display form.

Meanwhile, as the rotation result of the first display unit 22, in a case where the determination unit 64 determines that the first display unit 22 and the second display unit 32 have the second posture relationship with which the display screens thereof are simultaneously visible in step S16 (in the case of "Yes"), the process proceeds to step S18.

In step S18, the determination unit determines whether or not the display form of the first display unit 22 is currently the normal display form (that is, whether or not F=0), and the process proceeds to step S20 in a case where the display form of the first display unit is the first display form which is the normal display form (in the case of "Yes").

In step S20, the display controller 50 reduces the plurality of camera information items (overlapped information items) among the first camera information items displayed in the edge part of the display screen of the first display unit 22 which are overlapped with the second camera information items displayed on the second display unit 32, and displays the first animation for gathering the overlapped information items in the central region of the display screen of the first display unit 22 on the first display unit 22 (FIG. 9). In this case, the animation which appears without being moved is displayed on the first display unit 22, as the icon I15 set so as to be displayed on only the second display unit 32.

Subsequently, the display controller 50 displays the first animation on the first display unit 22, and displays the second animation for removing the overlapped information items from the display screen of the first display unit 22 by moving the plurality of overlapped information items gathered in the central region of the display screen of the first display unit 22 to the outside of the display screen of the first display unit 22, on the first display unit 22 (step S22, FIG. 10).

In a case where the display of the second animation is ended, the display form of the first display unit 22 is a second display form in which the overlapped information items are removed from the display screen and only the live view image is displayed, and a flag F (F=1) indicating the second display form is set as the flag F (step S24).

In a case where the display form of the first display unit 22 is changed to the second display form (in the case of F=1), the display controller 50 displays only the live view image on the first display unit 22 (step S26, FIG. 4), and the process proceeds to step S14.

In a state in which the display form of the first display unit 22 is changed to the second display form (F=1), in a case where it is determined in step S16 that the first display unit 22 and the second display unit 32 have the first posture relationship with which the display screens thereof are simultaneously invisible (in the case of "No"), the process proceeds to step S10. Accordingly, the display form of the first display unit 22 is changed to the first display form which is the normal display form from the second display form.

In a state in which the display form of the first display unit 22 is changed to the second display form (F=1), in a case where it is determined in step S16 that the first display unit 22 and the second display unit 32 have the second posture relationship with which the display screens thereof are simultaneously visible (in the case of "Yes", the process proceeds to step S18. In this case, it is determined in step S18 that the display form of the first display unit 22 is currently the second display form (F=1), the process jumps to step S26 from step S18. Accordingly, only the live view image is subsequently displayed on the display screen of the first display unit 22.

[Others]

Although it has been described in the present embodiment that the overlapped information items of the first camera information items displayed on the display screen of the first display unit 22 and the second camera information items displayed on the second display unit 32 are removed, the present invention is not limited thereto. The first camera information items displayed on the display screen of the first display unit 22 may be removed. In this case, since camera information items (difference information items) different from the second camera information items displayed on the display screen of the second display unit 32 are included in the first camera information items displayed on the display screen of the first display unit 22, it is possible to remove all the first camera information items displayed on the first display unit 22.

In this case, in order to solve the problem that it is difficult to check the difference information items on the second display unit 32, it is preferable that the difference information items between the first camera information items and the second camera information items are displayed on the second display unit 32. Accordingly, even though all the first camera information items are removed from the first display unit 22, it is possible to view the removed first camera information items by the second camera information items displayed on the second display unit 32 and the difference information items.

Although it has been described in the present embodiment that the transmissive type color liquid crystal display device is used as the first display units 22 and 22-2, the present invention is not limited thereto. The first display unit may be another display device such as an organic electroluminescence display device or a semi-transmissive type liquid crystal display device. Although it has been described that the reflective type monochrome liquid crystal display device is used as the second display units 32 and 32-2, the present invention is not limited thereto. The second display unit may be another display device such as a reflective type color liquid crystal display device, an electronic paper, a memory liquid crystal display device, or a semi-transmissive type liquid crystal display device.

The digital camera mainly includes a digital video camera that images the video, and the live view image includes an image in a case where the video is actually captured.

The present invention is not limited to the above-described embodiments, and may be modified without departing from the spirit of the present invention.

EXPLANATION OF REFERENCES 1, 1-2, 1-3: digital camera
10: interchangeable lens
20: camera main body
22: first display unit
22-2: first display unit
22A, 22-2A, 32-2A: hinge
24: exposure correction dial
26: shutter speed dial
28: indicator lamp
30: shutter button
32, 32-2: second display unit
34: flash
40: imaging unit
42: signal processing unit
44: image recording and playing unit
46: operation unit
48: communication unit
50: display controller
51: display data generating unit
52: image combining unit
54: character generator
55: camera information generating unit
60: first angle detection unit
62: second angle detection unit
64: determination unit
66: animation display selecting unit
70: CPU
S10 to S26: step

What is claimed is:

1. A digital camera that displays a live view image captured by an imaging unit and a plurality of camera information items including imaging conditions set by a setting unit, the digital camera comprising:
a first display unit and a second display unit that are respectively disposed at a camera main body, at least one of the first display unit or the second display unit being disposed so as to be rotatable around the camera main body, and a relative posture between the first display unit and the second display unit being changeable;
a posture detection unit that detects the relative posture relationship between the first display unit and the second display unit;
a determination unit that determines whether the first display unit and the second display unit have a first posture relationship with which display screens thereof are simultaneously invisible or have a second posture relationship with which the display screens thereof are simultaneously visible based on the relative posture relationship detected by the posture detection unit;
a first display controller that displays the live view image on the first display unit, and displays first camera information items among the plurality of camera information items on the display screen of the first display unit; and
a second display controller that displays second camera information items among the plurality of camera information items on the second display unit,
wherein, in a case where the determination unit determines that the first display unit and the second display unit have the second posture relationship, the first display controller displays first animation for gathering at least overlapped information items among the first camera information items displayed on the first display unit which are overlapped with the second camera information items displayed on the second display unit in a specific region of the display screen of the first display unit, on the first display unit, and displays second animation for removing the overlapped information items from the display screen of the first display unit by moving the overlapped information items gathered in the specific region to an outside of the display screen of the first display unit, on the first display unit.

2. The digital camera according to claim 1,
wherein the first display controller displays the second animation for removing the overlapped information items from the display screen of the first display unit by moving the overlapped information items gathered in the specific region toward the second display unit, on the first display unit.

3. The digital camera according to claim 1, further comprising:
a first camera information selecting unit that selects the first camera information items to be displayed on the first display unit,
wherein the first display controller displays the first camera information items selected by the first camera information selecting unit on the first display unit.

4. The digital camera according to claim 1, further comprising:
a second camera information selecting unit that selects the second camera information items to be displayed on the second display unit,
wherein the second display controller displays the second camera information items selected by the second camera information selecting unit on the second display unit.

5. The digital camera according to claim 1,
wherein, in a case where the overlapped information items are gathered in the specific region of the display screen of the first display unit, the first display controller displays the first animation in which a layout of the overlapped information items gathered in the specific region matches a layout of the second camera information items displayed on the second display unit, on the first display unit.

6. The digital camera according to claim 5, further comprising:
a second camera information selecting unit that selects the second camera information items to be displayed on the second display unit,
wherein the second display controller displays the second camera information items selected by the second camera information selecting unit on the second display unit, and
the first display controller displays the first animation in which the layout of the overlapped information items gathered in the specific region is changed so as to correspond to the layout of the second camera information items which are selected by the second camera information selecting unit and are displayed on the second display unit, on the first display unit.

7. The digital camera according to claim 1,
wherein, in a case where the overlapped information items are gathered in the specific region of the display screen of the first display unit, the first display controller displays the first animation in which a layout of the overlapped information items gathered in the specific region matches a layout of the first camera information items displayed on the first display unit, on the first display unit.

8. The digital camera according to claim 1,
wherein the display screen of the first display unit is larger than the display screen of the second display unit, and
an image size of the first camera information items displayed on the display screen of the first display unit is larger than an image size of the second camera information items displayed on the display screen of the second display unit.

9. The digital camera according to claim 8,
wherein the first display controller displays the second animation and the first animation in which the image size of the first camera information items included in the overlapped information items is reduced on the first display unit.

10. The digital camera according to claim 1, further comprising:
a notification unit that notifies that the overlapped information items are removed from the first display unit and the overlapped information items are displayed on the second display unit.

11. The digital camera according to claim 10,
wherein the second display unit and the second display controller include the notification unit, and
the second display controller turns on and off the second camera information items displayed on the second display unit or changes brightness of the display screen of the second display unit for a period during which the first animation and the second animation are displayed on the first display unit or for a predetermined period after the display of the second animation is ended.

12. The digital camera according to claim 10,
wherein the notification unit includes a lamp disposed near the second display unit, and the lamp is turned on or turned on and off for a period during which the first animation and the second animation are displayed on the first display unit or for a predetermined period after the display of the second animation is ended.

13. The digital camera according to claim 1, further comprising:
an animation display selecting unit that selects whether or not to display the first animation and the second animation on the first display unit,
wherein the first display controller displays the first animation and the second animation on the first display unit only in a case where the display of the first animation and the second animation is selected by the animation display selecting unit.

14. The digital camera according to claim 1,
wherein, in a case where the overlapped information items are removed from the first display unit and the determination unit determines that the first and second display units have the first posture relationship, the first display controller displays the overlapped information items on the first display unit.

15. The digital camera according to claim 1,
wherein, in a case where the first camera information items including the overlapped information items are removed from the display screen of the first display unit by the first display controller, the second display controller displays difference information items between the first camera information items and the second camera information items on the second display unit.

16. A display method of a digital camera that displays a live view image captured by an imaging unit and a plurality of camera information items including imaging conditions set by a setting unit, the display method comprising:
a step of detecting a relative posture relationship between a first display unit and a second display unit which are respectively disposed at a camera main body;
a step of determining whether the first display unit and the second display unit have a first posture relationship with which display screens thereof are simultaneously invisible or have a second posture relationship with which the display screens thereof are simultaneously visible based on the detected relative posture relationship;
a step of displaying the live view image on the first display unit and displays first camera information items among the plurality of camera information items on the display screen of the first display unit in a case where it is determined that the first and second display units have the first posture relationship;
a step of displaying second camera information items among the plurality of camera information items on the second display unit irrespective of the first posture relationship or the second posture relationship; and
a step of displaying first animation for gathering at least overlapped information items among the first camera information items displayed on the first display unit which are overlapped with the second camera information items displayed on the second display unit in a specific region of the display screen of the first display unit, on the first display unit, and displaying second animation for removing the overlapped information items from the display screen of the first display unit by moving the overlapped information items gathered in the specific region to an outside of the display screen of the first display unit, on the first display unit, in a case where it is determined that the first and second display units have the second posture relationship.

* * * * *